United States Patent
Kang et al.

(10) Patent No.: US 8,199,413 B2
(45) Date of Patent: Jun. 12, 2012

(54) COMPACT ZOOM OPTICAL SYSTEM

(75) Inventors: Seok-bong Kang, Suwon-si (KR); Jang-hoon Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 12/877,247

(22) Filed: Sep. 8, 2010

(65) Prior Publication Data

US 2011/0063737 A1    Mar. 17, 2011

(30) Foreign Application Priority Data

Sep. 11, 2009  (KR) .......................... 10-2009-0085872

(51) Int. Cl.
*G02B 15/14* (2006.01)

(52) U.S. Cl. ....................................... 359/682; 359/684

(58) Field of Classification Search ............... 348/240.3; 359/680, 682, 684

See application file for complete search history.

(56) References Cited

U.S. PATENT DOCUMENTS

| 7,777,965 B2 * | 8/2010 | Eguchi | 359/682 |
| 7,808,720 B2 * | 10/2010 | Eguchi | 359/689 |
| 2011/0058260 A1 * | 3/2011 | Kim | 359/684 |

* cited by examiner

*Primary Examiner* — David N Spector

(74) *Attorney, Agent, or Firm* — Drinker Biddle & Reath LLP

(57) ABSTRACT

A zoom optical system including a first lens group including a plastic aspherical lens and having a negative refractive power, a second lens group having a positive refractive power, and a third lens group having a positive refractive power, wherein the first lens group, the second lens group and the third lens group are arrange sequentially from an object side to an image side, and wherein the plastic aspherical lens satisfies the following Inequality:

$$0 \leq (R21-R22)^2 \leq 0.04,$$

where R21 denotes the radius of curvature of the plastic aspherical lens corresponding to the object side, and R22 denotes the radius of curvature of the plastic aspherical lens corresponding to the image side.

13 Claims, 24 Drawing Sheets

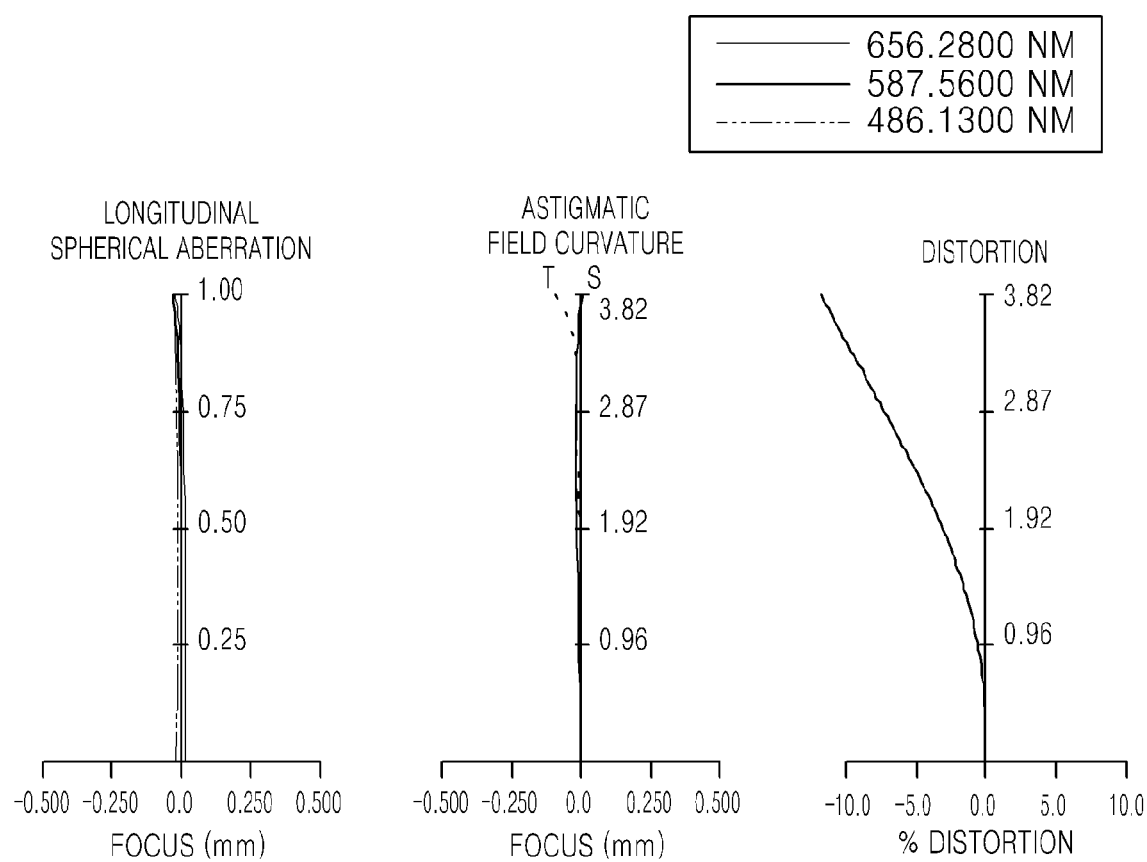

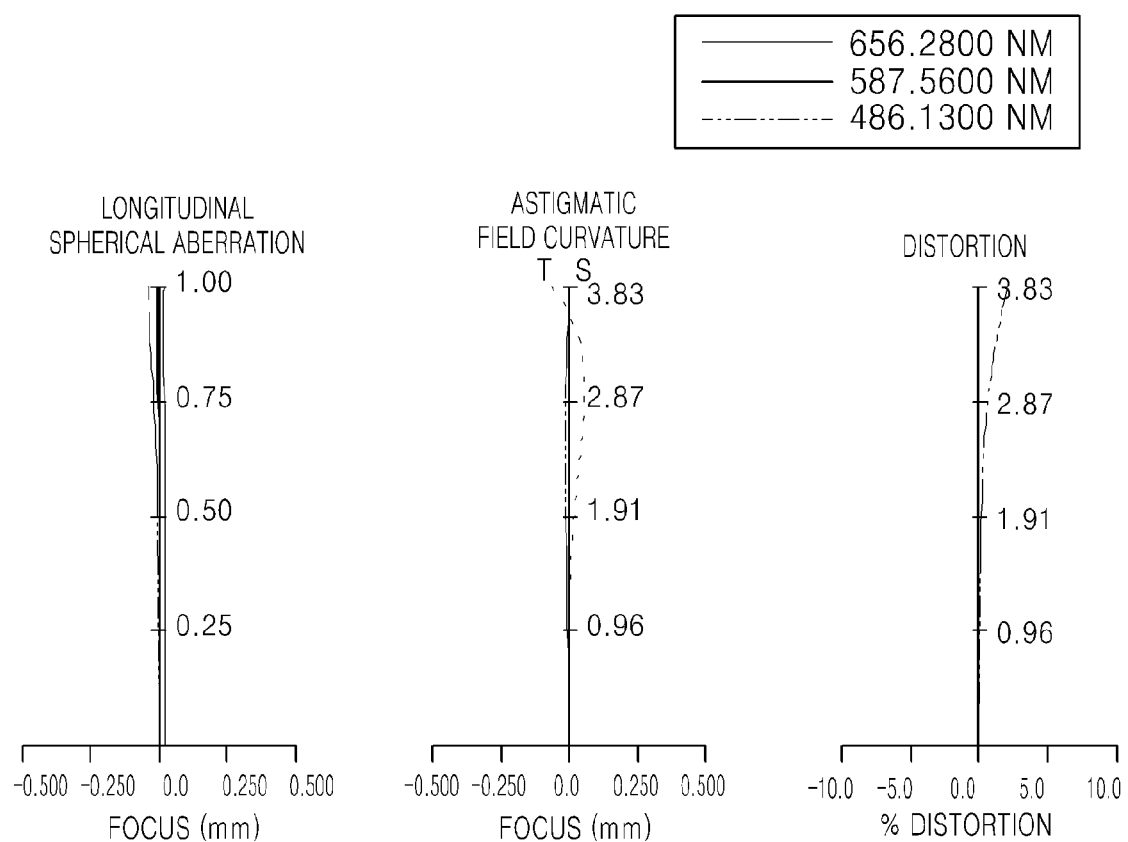

COMPACT ZOOM OPTICAL SYSTEM

CROSS-REFERENCE TO RELATED PATENT APPLICATION

This application claims the benefit of Korean Patent Application No. 10-2009-0085872, filed on Sep. 11, 2009, in the Korean Intellectual Property Office, the disclosure of which is incorporated herein in its entirety by reference.

BACKGROUND OF THE INVENTION

1. Field of the Invention

The invention relates to a zoom optical system having a compact structure and realizing high magnification.

2. Description of the Related Art

Currently, optical imaging devices such as digital cameras or video cameras having an imaging device, such as a charge coupled device (CCD) or a complementary metal-oxide semiconductor (CMOS), are widely spread. Optical imaging devices are required to have high performance, such as high magnification and high pixel number. In addition, optical imaging devices are required to be small, light and inexpensive. Thus, the imaging optical devices are required to have high performance such as increased magnification and pixel number and to be small, light and inexpensive. Accordingly, a zoom optical system including an optical imaging device is also required to have high performance and to be inexpensive.

In order to realize a high-pixel large-sized imaging device, the number of lenses included in a zoom optical system has gradually increased, and a lens full length has increased. In order to simultaneously achieve a compact and high-definition zoom optical system, a glass lens, particularly, a glass aspherical lens, may be used. In this case, the weight and manufacturing costs of the zoom optical system increase since high precision and high processing costs are required to process the glass aspherical lens.

SUMMARY OF THE INVENTION

An embodiment of the invention provides a compact zoom optical system having a structure that is manufactured at a low cost, miniaturized, and having high magnification.

According to an embodiment of the invention, there is provided a zoom optical system including a first lens group including a plastic aspherical lens and having a negative refractive power; a second lens group having a positive refractive power; and a third lens group having a positive refractive power, wherein the first lens group, the second lens group and the third lens group are arranged sequentially from an object side to an image side, and wherein the plastic aspherical lens satisfies the following inequality:

$$0 \leq (R21-R22)^2 \leq 0.04,$$

where R21 denotes the radius of curvature of the plastic aspherical lens corresponding to the object side, and R22 denotes the radius of curvature of the plastic aspherical lens corresponding to the image side.

The plastic aspherical lens may satisfy the following inequality:

$$0 \leq (T2c-T2e)^2 \leq 0.09,$$

where T2c denotes the thickness at the center of the plastic aspherical lens, and T2e denotes the thickness at an edge of the plastic aspherical lens.

The third lens group may include at least one plastic aspherical lens.

Each plastic aspherical lens may satisfy one of the following inequalities:

$$1.5 \leq n \leq 1.6, \text{ and}$$

$$50 \leq v \leq 60,$$

where 'n' denotes a refractive index of the plastic aspherical lens, and 'v' denotes an Abbe number of the plastic aspherical lens.

During zooming from a wide-angle position to a telephoto position, the first lens group, the second lens group and the third lens group may be moved along the optical axis.

The second lens group may include a positive lens formed of a glass material and having an aspherical surface; and a double lens formed by bonding a positive lens and a negative lens to each other.

The first lens group may include a meniscus lens having a surface being convex towards the object side.

The zoom optical system may further include a fourth lens group including a double lens disposed between the first lens group and the object side, and having a positive refractive power.

The double lens may include a lens having a negative refractive power and a lens having a positive refractive power, which are arranged sequentially from the object side.

During zooming from a wide-angle position to a telephoto position, the first lens group, the second lens group, the third lens group and the fourth lens group may be moved along an optical axis.

The zoom optical system may satisfy the following inequality:

$$4.0 \leq Tw/fw \leq 7.0,$$

where Tw denotes a full length of the zoom optical system at a wide-angle position, and fw denotes a focal length of the zoom optical system at the wide-angle position.

BRIEF DESCRIPTION OF THE DRAWINGS

The above and other features and advantages will become more apparent from the following detailed description of exemplary embodiments with reference to the attached drawings in which:

FIGS. 2A, 2B and 2C show diagrams of longitudinal spherical aberrations, astigmatic field curvatures and % distortions at a wide-angle position, an intermediate position, and a telephoto position of the zoom optical system of FIG. 1, respectively;

FIGS. 8A, 8B and 8C show diagrams of longitudinal spherical aberrations, astigmatic field curvatures and % distortions at a wide-angle position, an intermediate position, and a telephoto position of the zoom optical system of FIG. 7, respectively;

DETAILED DESCRIPTION OF THE INVENTION

Figure 1:
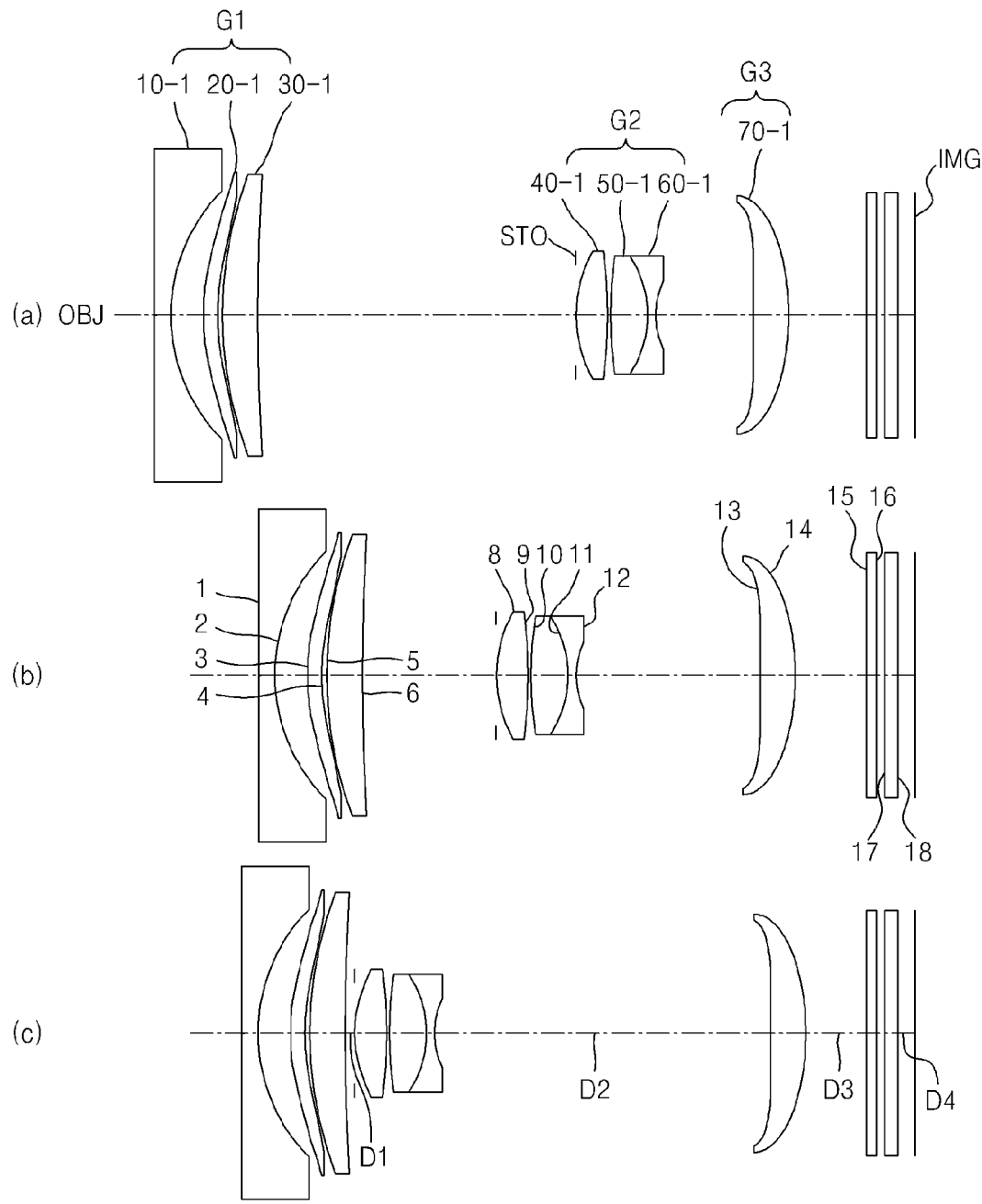
FIG. 1 shows an optical arrangement of a zoom optical system at a wide-angle position, an intermediate position, and a telephoto position, according to an embodiment of the invention.

Hereinafter, the invention will be described in detail by describing exemplary embodiments of the invention with reference to the attached drawings. Like reference numerals in the drawings denote like elements. In the drawings, the sizes of elements are exaggerated for clarity.

FIGS. 1, 3, 5, 7, 9 and 11 show optical arrangements of zoom optical systems at a wide-angle position, an intermediate position, and a telephoto position, according to embodiments of the invention.

Referring to FIGS. 1, 3, 5, 7, 9 and 11, the zoom optical systems may include three lens groups or four lens groups.

Figure 3:
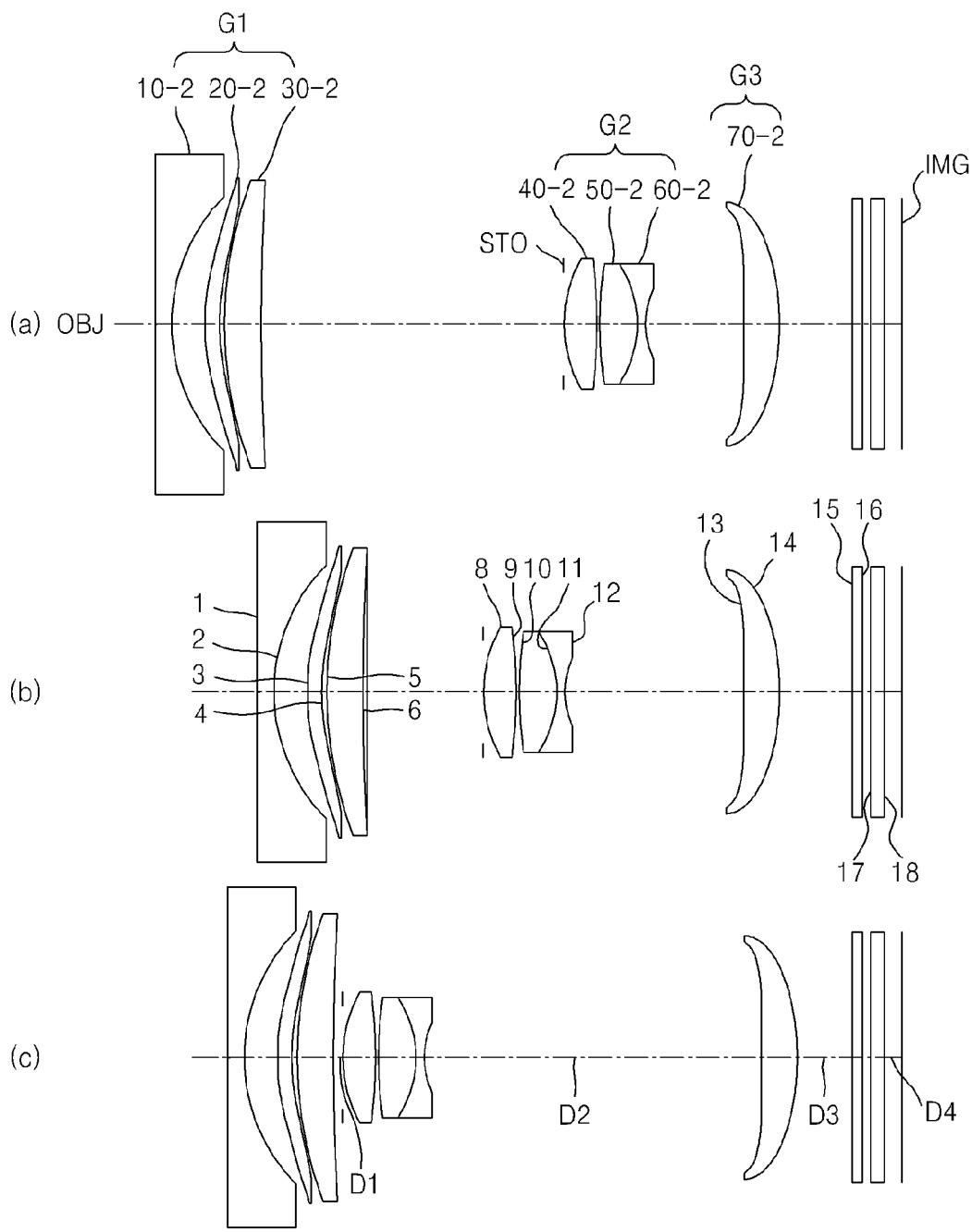
FIG. 3 shows an optical arrangement of a zoom optical system at a wide-angle position, an intermediate position, and a telephoto position, according to another embodiment of the invention.
Figure 5:
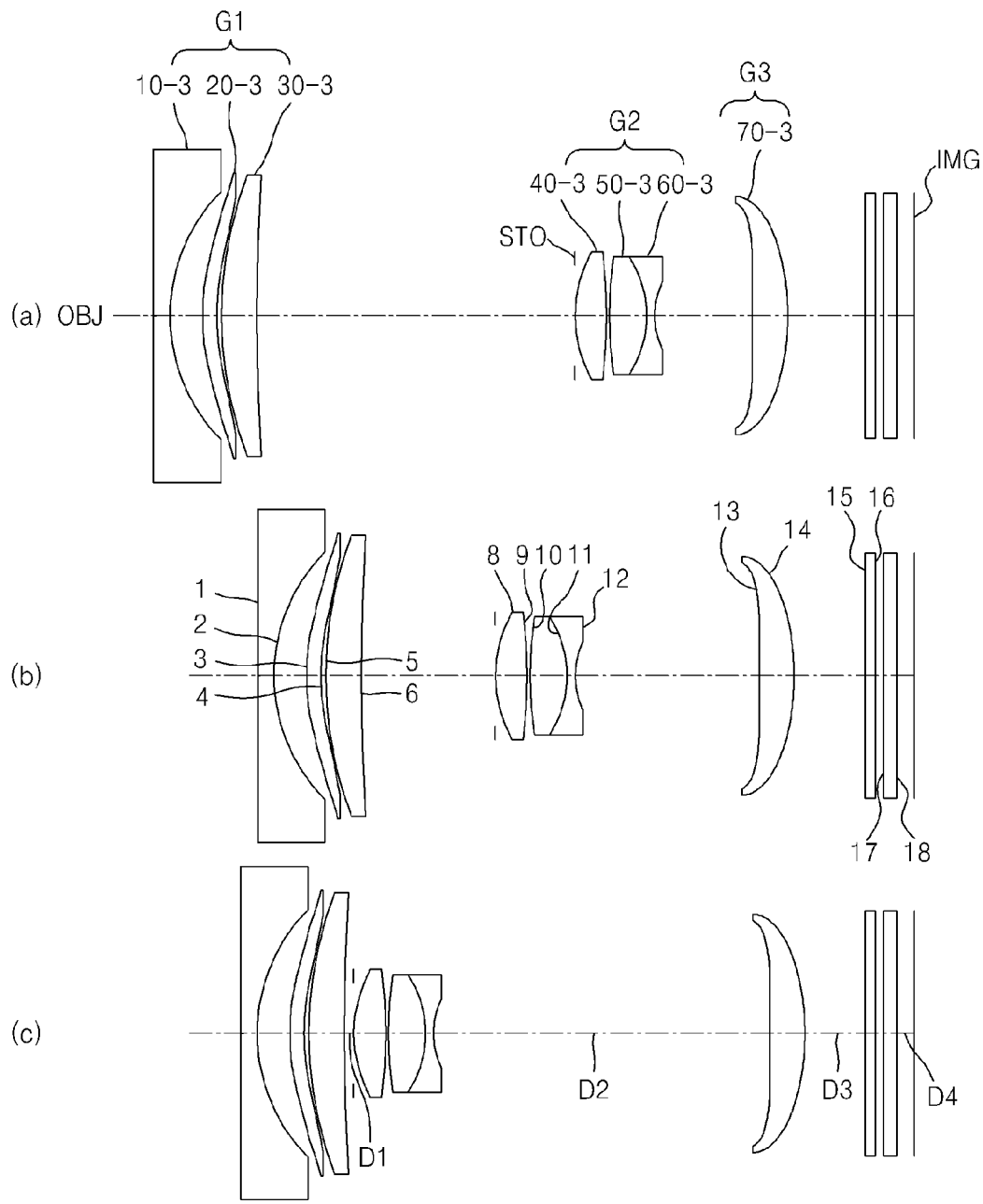
FIG. 5 shows an optical arrangement of a zoom optical system at a wide-angle position, an intermediate position, and a telephoto position, according to another embodiment of the invention.

Each of the zoom optical systems of FIGS. 1, 3 and 5 includes three lens groups, that is, a first lens group G1 having a negative refractive power, a second lens group G2 having a positive refractive power, and a third lens group G3 having a positive refractive power arranged sequentially from an object OBJ side to an image IMG side.

Figure 7:
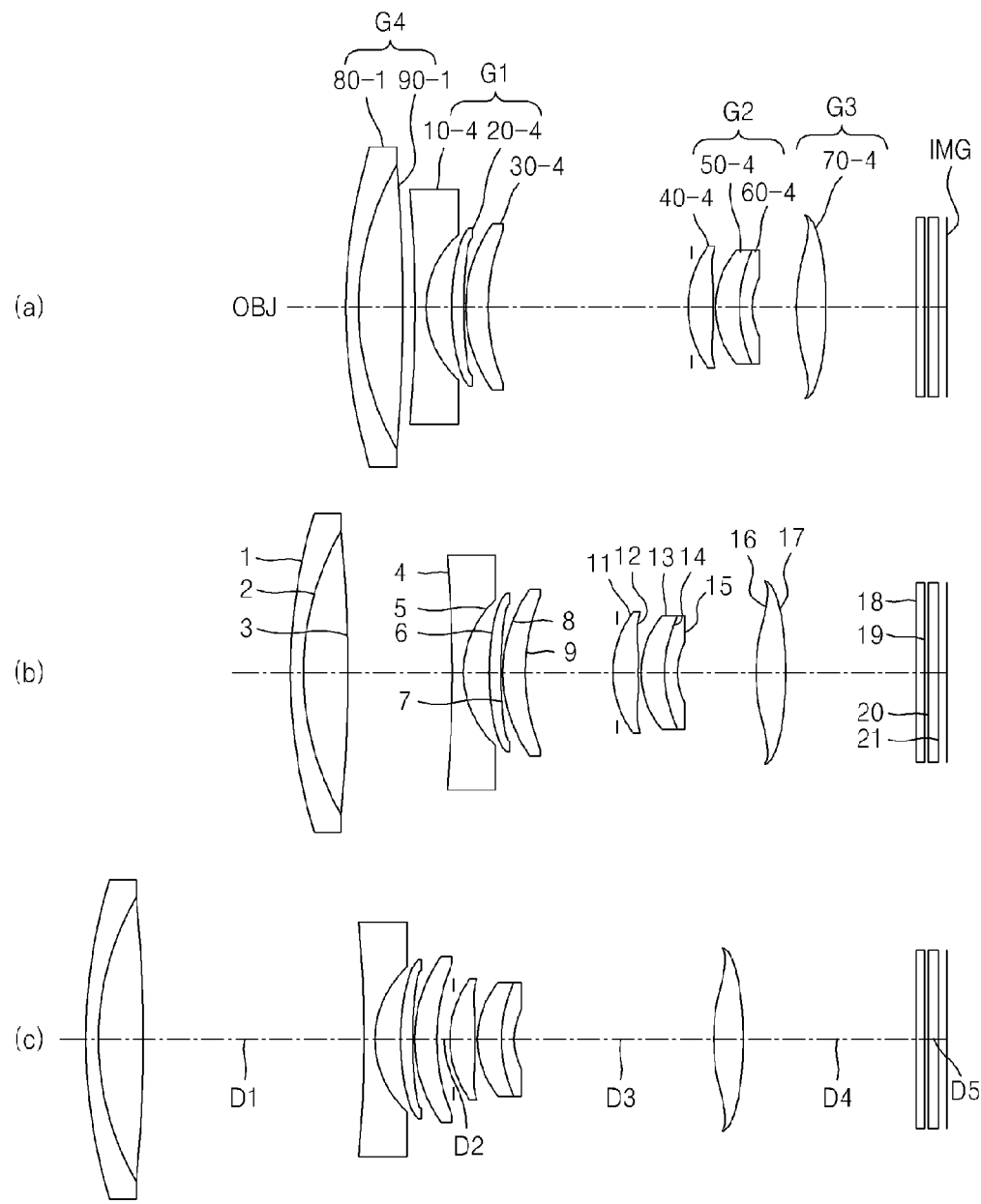
FIG. 7 shows an optical arrangement of a zoom optical system at a wide-angle position, an intermediate position, and a telephoto position, according to another embodiment of the invention.
Figure 9:
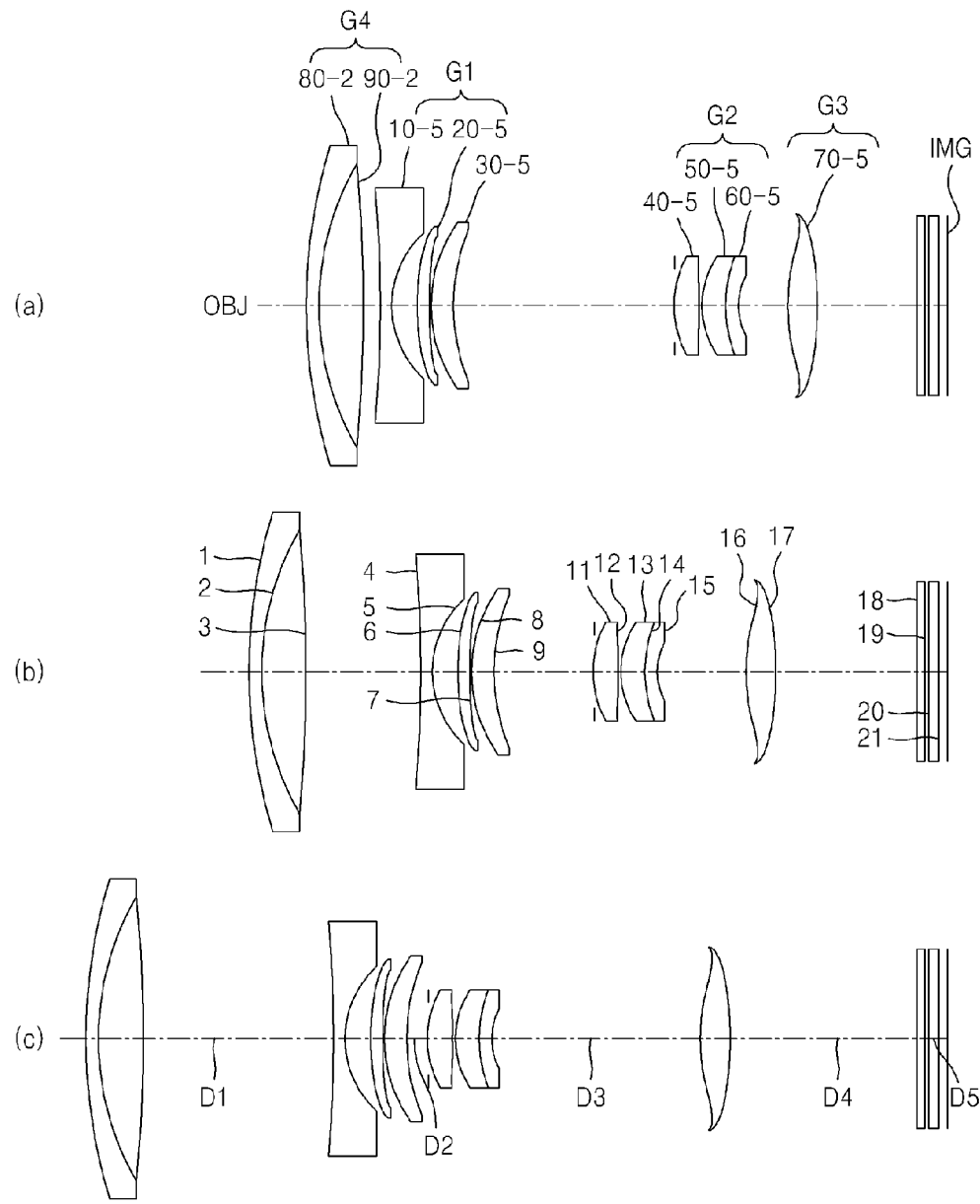
FIG. 9 shows an optical arrangement of a zoom optical system at a wide-angle position, an intermediate position, and a telephoto position, according to another embodiment of the invention.
Figure 11:
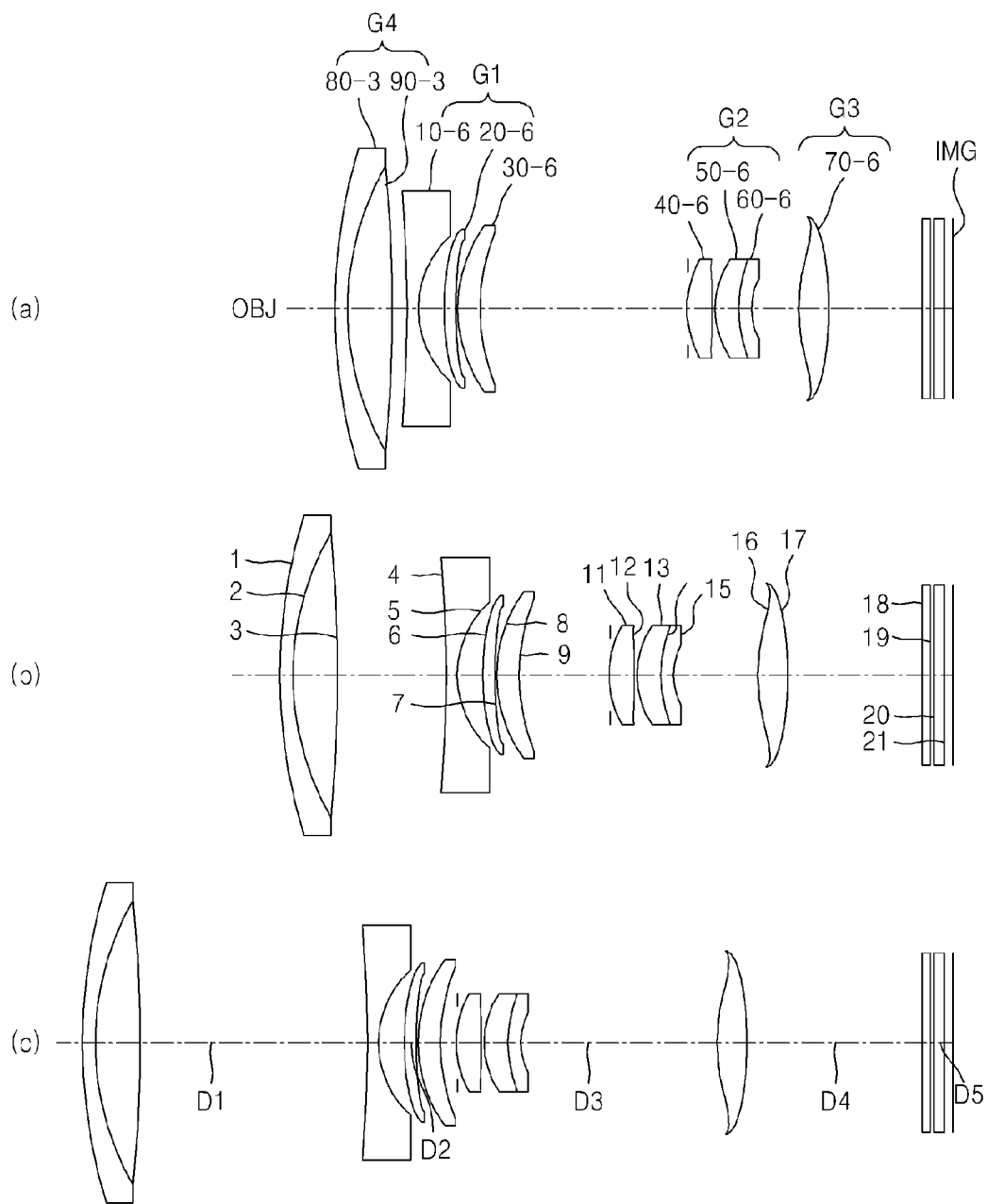
FIG. 11 shows an optical arrangement of a zoom optical system at a wide-angle position, an intermediate position, and a telephoto position, according to another embodiment of the invention.

Each of the zoom optical systems of FIGS. 7, 9 and 11 includes four lens groups. That is, in addition to the three lenses of FIGS. 1, 3 and 5, includes a fourth lens group G4 having a positive refractive power disposed between the object OBJ side and the first lens group G1. Thus, each of the zoom optical systems of FIGS. 7, 9 and 11 includes the fourth lens group G4 having a positive refractive power, the first lens group G1 having a negative refractive power, the second lens group G2 having a positive refractive power, and the third lens group G3 having a positive refractive power, which are arranged sequentially from the object OBJ side to the image IMG side.

Each of the zoom optical systems of FIGS. 1, 3, 5, 7, 9 and 11 includes an aperture diaphragm STO that is disposed between the first lens group G1 and the second lens group G2 and moves in connection to the second lens group G2. In the zoom optical systems of FIGS. 1, 3 and 5, during zooming from the wide-angle position to the telephoto position, the first lens group G1, the second lens group G2, and the third lens group G3 are moved. In the zoom optical systems of FIGS. 7, 9 and 11, the first to third groups G1, G2 and G3 in addition to the fourth lens group G4 are moved. In detail, the distance between the first lens group G1 and the second lens group G2 reduces, and the distance between the second lens group G2 and the third lens group G3 increases. In addition, the third lens group G3 adjusts the focal point according to the distance from an object.

Each of the zoom optical systems of FIGS. 1, 3, 5, 7, 9 and 11 uses a plastic aspherical lens in the first lens group G1 in order to reduce manufacturing costs. For example, a second lens of the first lens group G1 from the object OBJ side may be formed of plastic. The plastic aspherical lens is configured so as to satisfy Inequality 1:

$$0 \leq (R21-R22)^2 \leq 0.04, \qquad \text{Inequality 1}$$

where R21 denotes the radius of curvature of the plastic aspherical lens corresponding to the object OBJ side, and R22 denotes the radius of curvature of the plastic aspherical lens corresponding to the image IMG side.

Refractive power of a plastic material, compared to a glass material, is more sensitive to changes in temperature, pressure and moisture and thus the performance of an optical system using a plastic material changes more according to temperature, pressure and moisture. In order to prevent this problem, the plastic aspherical lens of the first lens group G1 of each of the zoom optical systems of FIGS. 1, 3, 5, 7, 9 and 11 satisfies Inequality 1. Thus, when a refractive index of the plastic aspherical lens is about 1.5, a change in a refractive power of the plastic aspherical lens is restricted within ±0.1 mm$^{-1}$, which means that the refractive power of the plastic aspherical lens is not substantially changed.

The plastic aspherical lens is configured so as to satisfy Inequality 2:

$$0 \leq (T2c-T2e)^2 \leq 0.09, \qquad \text{Inequality 2}$$

where T2c denotes the thickness of the center of the plastic aspherical lens, and T2e denotes the thickness of an edge of the plastic aspherical lens.

Inequality 2 represents a condition under which a change in refractive power due to the shape of the plastic aspherical lens of the first lens group G1 is substantially prevented. Although a change in refractive power along the radial axis is removed by Inequality 1, radii of curvature of the center and edge of the plastic aspherical lens may be different according to the shape of the plastic aspherical lens, which, according to an environmental change, may be the main reason for deterioration of the performance of each of the zoom optical systems of FIGS. 1, 3, 5, 7, 9 and 11. By restricting the difference between the thickness of the center on the radial axis and the thickness of the edge to be within 0.3 mm, a substantial change in the refractive power of the plastic aspherical lens may be prevented.

Each of the zoom optical systems of FIGS. 1, 3, 5, 7, 9 and 11 uses at least one plastic aspherical lens in the third lens group G3, in addition to the aspherical lens in the first lens group G1, in order to reduce manufacturing costs. The plastic aspherical lens of the third lens group G3 and the plastic aspherical lens of the first lens group G1 are configured individually so as to satisfy Inequality 3 or 4:

$$1.5 \leq n \leq 1.6 \qquad \text{Inequality 3}$$

$$50 \leq v \leq 60, \qquad \text{Inequality 4}$$

where 'n' denotes the refractive index of the plastic aspherical lens, and 'v' denotes an Abbe number of the plastic aspherical lens.

Thus, the plastic aspherical lenses of each of the zoom optical systems according to the embodiments of the present invention may have refractive indices and Abbe numbers that are the most efficient to control aberration of the plastic aspherical lenses and to improve the performance of the plastic aspherical lenses.

In addition, each of the zoom optical systems according to the embodiments of the present invention satisfies Inequality 5:

$$4.0 \leq Tw/fw \leq 7.0,$$  Inequality 5 where Tw denotes the full length of the zoom optical system at the wide-angle position, and fw denotes the focal length of the zoom optical system at the wide-angle position.

Inequality 5 controls the full length of the zoom optical system according to the focal length of the zoom optical system. In Inequality 5, when Tw/fw is equal to the lowermost value, the full length is relatively short compared to the focal length, and thus it is difficult to design the zoom optical system. When Tw/fw has the uppermost value, the full length is relatively long compared to the focal length.

Construction of the first through fourth lens groups G1 through G4 will now be described in more detail.

The first lens group G1 is configured so as to have a negative refractive power, and includes a first lens 10-1, a second lens 20-1, and a third lens 30-1 arranged sequentially from the object OBJ side. The first lens 10-1 is a negative lens. The second lens 20-1 is configured so as to satisfy Inequalities 1 and 2 and is to be a plastic aspherical lens having almost no refractive power. The third lens 30-1 is a positive lens.

The first lens 10-1 and the third lens 30-1 are formed of a material having a high refractive index equal to or greater than 1.85 so as to largely refract a light beam and to reduce an aperture of the zoom optical system. In addition, the second lens 20-1, that is, a plastic aspherical lens, is disposed between the first lens 10-1 and the third lens 30-1 so as to compensate for spherical aberration, coma, astigmatic aberration, etc. If another lens group, that is, the fourth lens group G4, is not disposed in front of the first lens group G1, the first lens 10-1 of the first lens group G1 may be a meniscus lens being convex towards the object OBJ side.

The first lens group G1 is configured in consideration of control of aberration, miniaturization of the zoom optical system and power of the zoom optical system, and a plastic lens is used in the first lens group G1, thereby reducing the manufacturing costs of the zoom optical system.

The second lens group G2 may be in charge of magnification of the zoom optical system, and may include three lenses. The second lens group G2 includes, for example, a fourth lens 40-1 having a positive refractive power, a fifth lens 50-1 having a positive refractive power, and a sixth lens 60-1 having a negative refractive power, and may be configured so as to easily control aberration. The second lens group G2 includes at least one double lens. For example, the fifth lens 50-1 and the sixth lens 60-1 may constitute a double lens. At least one lens included in the second lens group G2 may include an aspherical surface. For example, an aspherical lens having at least one aspherical surface may be used as the fourth lens 40-1, that is, a first lens of the second lens group G2 from the object OBJ side, for controlling spherical aberration. The second lens group G2 may be configured so as to move in a perpendicular direction to an optical axis in order to compensate for image shake due to hand shake.

The third lens group G3 may be in charge of focusing according to distance to an object, and may include, for example, a seventh lens 70-1 having a positive refractive power. The seventh lens 70-1 may be a plastic lens in order to reduce manufacturing costs. The third lens group G3 adjusts focusing, and thus the third lens group G3 may offset a change in the properties of the plastic lens due to surrounding temperature, pressure and moisture. In addition, a plastic aspherical lens may be used as the seventh lens 70-1 so as to compensate for astigmatic field curvature and distortion.

Each of the zoom optical systems of FIGS. 7, 9 and 11 may further include, in addition to the first to third lens group G1, G2, and G3, the fourth lens group G4 including two lenses and having a positive refractive power, disposed between the object OBJ side and the first lens group G1. The fourth lens group G4 may include, for example, an eighth lens 80-1 having a negative refractive power, and a ninth lens 90-1 having a positive refractive power. The eighth lens 80-1 and the ninth lens 90-1 may constitute a doublet lens. In order to achieve high magnification during zooming from the wide-angle position to the telephoto position, the fourth lens group G4 refracts a light beam in such a way so as to be incident on the first lens group G1 having a negative refractive power, while simultaneously compensating for chromatic aberration and spherical aberration.

Hereinafter, detailed lens data according to embodiments of the present invention will be described. The aspherical surface may be defined as follows $$x = \frac{c'y^2}{1 + \sqrt{1 - (K+1)c'^2 y^2}} + Ay^4 + By^6 + Cy^8 + Dy^{10}$$

Here, x denotes the distance from the vertex of a lens in the optical axis direction, and y denotes the distance in the direction perpendicular to the optical axis direction. K denotes a conic constant, A, B, C, and D denote aspheric coefficients, and c' denotes a reciprocal of the radius of curvature (1/R) at the vertex of the lens.

Hereinafter, f denotes the focal length of the entire zoom lens, Fno denotes the F number, 2ω denotes the angle of view. RDY denotes the radius of curvature of a lens, THI denotes the thickness of a lens or the distance between lenses, and GLA denotes a value corresponding to the refractive index and Abbe number. STO denotes a surface of an aperture diaphragm. The indication '*' means that a surface is an aspherical surface. In each of the embodiments, variable distances between lenses are D1, D2, D3 and D4. Reference numerals of components are matched with the numbers indicating first through sixth embodiments.

First Embodiment

FIG. 1 shows a zoom optical system according to an embodiment of the invention. The first lens group G1 includes the first lens 10-1, the second lens 20-1 and the third lens 30-1. The second lens group G2 includes the fourth lens 40-1, the fifth lens 50-1, and the sixth lens 60-1. The third lens group G3 includes the seventh lens 70-1. An infrared ray filter and a cover glass may be disposed between the seventh lens 70-1 and an image IMG surface.

The following is lens data of First Embodiment.

|  | Wide-angle position | intermediate position | telephoto position |
|---|---|---|---|
| F | 5.11 | 8.41 | 14.56 |
| Fno | 2.90 | 3.67 | 5.21 |
| 2ω | 80.86 | 49.16 | 28.86 |

|  | RDY | THI | GLA |
|---|---|---|---|
| OBJ | INFINITY | INFINITY |  |
| 1 | −365.49036 | 0.600000 | 883000.408054 |
| 2 | 6.38022 | 1.142402 |  |
| 3* | 7.50000 | 0.500000 | 531100.559100 |
| 4* | 7.55000 | 0.166673 |  |
| 5 | 13.80268 | 1.300000 | 922860.208804 |
| 6 | 95.96068 | D1 |  |
| STO | INFINITY | 0.000000 |  |
| 8* | 4.43222 | 1.110000 | 693500.532008 |
| 9* | −18.85215 | 0.100000 |  |
| 10 | 12.30048 | 1.350000 | 834001.373451 |
| 11 | −3.92698 | 0.300000 | 717360.295005 |
| 12 | 3.00054 | D2 |  |
| 13* | −89.54550 | 1.260000 | 531100.559100 |
| 14* | −8.07805 | D3 |  |
| 15 | INFINITY | 0.300000 | 516798.641983 |
| 16 | INFINITY | 0.300000 |  |
| 17 | INFINITY | 0.500000 | 516798.641983 |
| 18 | INFINITY | 0.590000 |  |
| IMG | INFINITY | D4 |  |

| Surface | K | A | B | C | D |
|---|---|---|---|---|---|
| 3 | −0.526162 | −.151444E−02 | −.482809E−04 | 0.606394E−05 | −.136852E−06 |
| 4 | −4.614272 | −.927198E−03 | −.614259E−04 | 0.595923E−05 | −.146268E−06 |
| 8 | −4.638048 | 0.495989E−02 | −.418704E−03 | 0.182714E−04 | 0.000000E+00 |
| 9 | 0.000000 | 0.101676E−02 | −.196677E−04 | 0.000000E+00 | 0.000000E+00 |
| 13 | 0.000000 | −.361428E−03 | −.611411E−04 | 0.447050E−05 | −.384933E−06 |
| 14 | −18.450139 | −.341184E−02 | 0.211787E−03 | −.104981E−04 | 0.000000E+00 |

|  | wide-angle position | intermediate position | telephoto position |
|---|---|---|---|
| D1 | 11.427 | 4.801 | 0.402 |
| D2 | 3.544 | 6.656 | 12.050 |
| D3 | 2.817 | 2.558 | 2.196 |
| D4 | −0.004 | 0.015 | 0.020 |

Figure 2B:
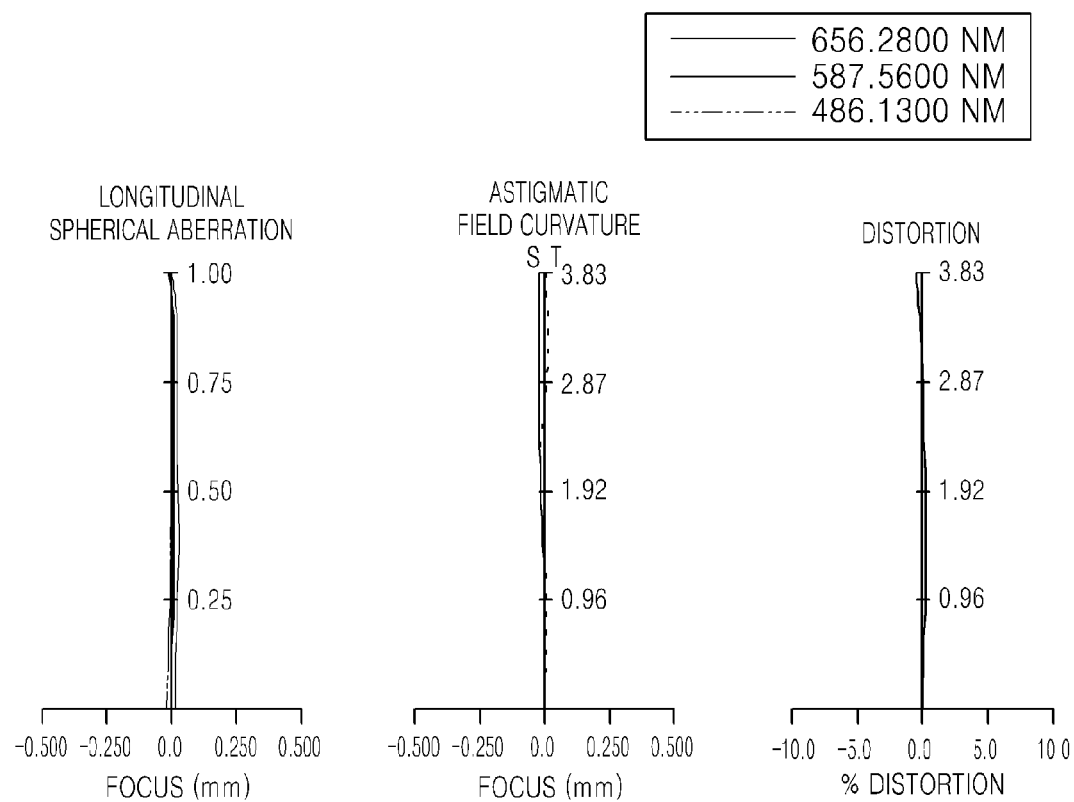
Figure 2C:
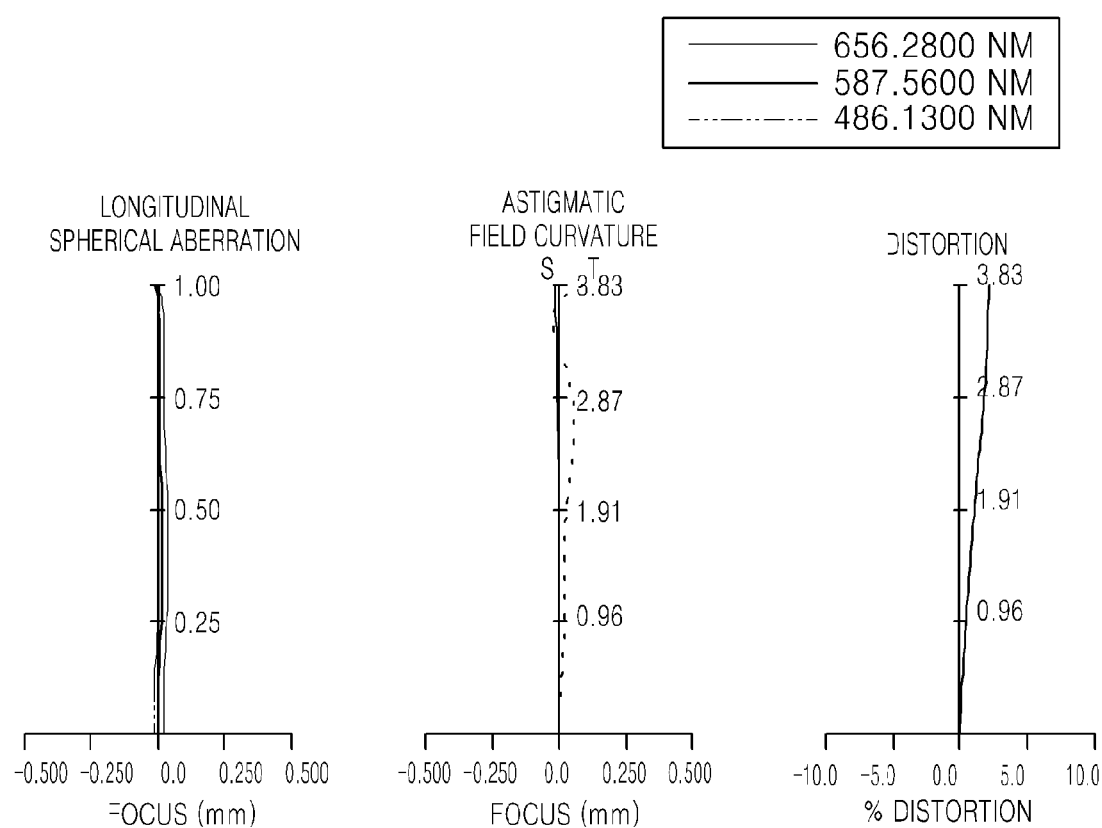

FIG. 2A shows diagrams of longitudinal spherical aberrations, astigmatic field curvatures (i.e., tangential field curvature (T) and sagittal field curvature (S)), and % distortion with respect to light beams having wavelengths of 486.1300 nm, 587.5600 nm, and 656.2800 nm at the wide-angle position of the zoom optical system of FIG. 1. FIGS. 2B and 2C show diagrams of longitudinal spherical aberrations, astigmatic field curvatures, and % distortions at the intermediate position and the telephoto position of the zoom optical system of FIG. 1.

Second Embodiment

FIG. 3 shows a zoom optical system according to another embodiment of the invention. The first lens group G1 includes a first lens 10-2, a second lens 20-2 and a third lens 30-2. The second lens group G2 includes a fourth lens 40-2, a fifth lens 50-2, and a sixth lens 60-2. The third lens group G3 includes a seventh lens 70-2. An infrared ray filter and a cover glass may be disposed between seventh lens 70-2 and an image IMG surface.

The following is lens data of Second Embodiment.

|  | wide-angle position | intermediate position | telephoto position |
|---|---|---|---|
| F | 5.10 | 8.42 | 14.54 |
| Fno | 2.83 | 3.60 | 5.18 |
| 2ω | 81.00 | 49.02 | 28.92 |

|  | RDY | THI | GLA |
|---|---|---|---|
| OBJ | INFINITY | INFINITY |  |
| 1 | 388.93446 | 0.600000 | 883000.408054 |
| 2 | 6.16823 | 1.160380 |  |
| 3* | 7.50000 | 0.500000 | 531100.559100 |

-continued

| | | | | |
|---|---|---|---|---|
| 4* | 7.54000 | 0.173507 | | |
| 5 | 11.97550 | 1.300000 | 922860.202208 | |
| 6 | 46.40039 | D1 | | |
| STO | INFINITY | 0.000000 | | |
| 8* | 4.42320 | 1.110000 | 693500.532008 | |
| 9* | −20.60221 | 0.100000 | | |
| 10 | 11.72761 | 1.350000 | 834040.320511 | |
| 11 | −3.90109 | 0.300000 | 717408.264427 | |
| 12 | 3.00000 | D2 | | |
| 13* | 70.27066 | 1.260000 | 531100.559100 | |
| 14* | −9.62856 | D3 | | |
| 15 | INFINITY | 0.300000 | 755201.275795 | |
| 16 | INFINITY | 0.300000 | | |
| 17 | INFINITY | 0.500000 | 669593.321295 | |
| 18 | INFINITY | 0.589995 | | |
| IMG | INFINITY | D4 | | |

| Surface | K | A | B | C | D |
|---|---|---|---|---|---|
| 3 | 0.614060 | −.628459E−03 | −.922336E−04 | 0.540059E−05 | −.105204E−06 |
| 4 | −1.991695 | −.463166E−03 | −.787005E−04 | 0.503517E−05 | −.103751E−06 |
| 8 | −4.195769 | 0.434665E−02 | −.330839E−03 | 0.127297E−04 | 0.000000E+00 |
| 9 | 0.000000 | 0.928237E−03 | −.378093E−05 | 0.000000E+00 | 0.000000E+00 |
| 13 | 0.000000 | 0.353936E−03 | −.686979E−04 | 0.208635E−05 | −.234913E−06 |
| 14 | −22.860095 | −.161418E−02 | 0.949549E−04 | −.705097E−05 | 0.000000E+00 |

| | wide-angle position | intermediate position | telephoto position |
|---|---|---|---|
| D1 | 11.031 | 4.418 | 0.397 |
| D2 | 3.480 | 6.485 | 12.237 |
| D3 | 2.815 | 2.715 | 2.040 |
| D4 | −0.012 | 0.014 | 0.014 |

Figure 4A:
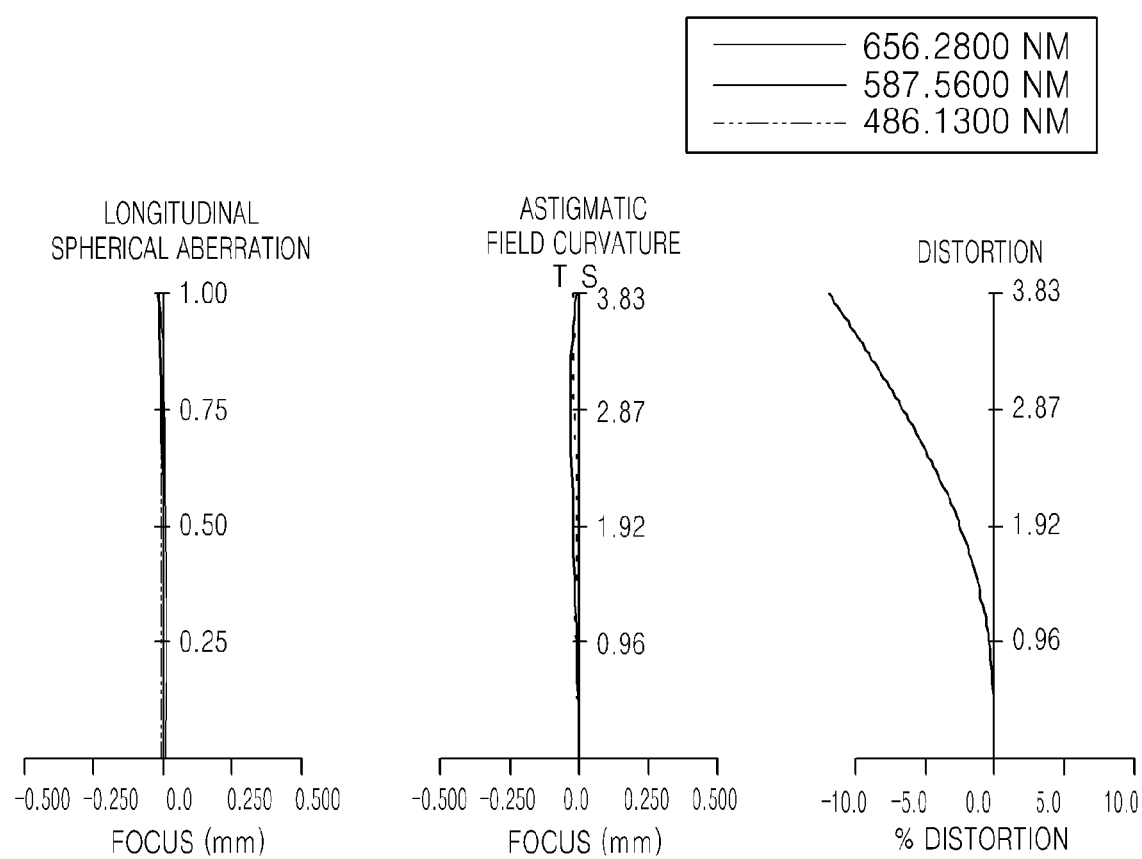
FIGS. 4A, 4B and 4C show diagrams of longitudinal spherical aberrations, astigmatic field curvatures and % distortions at a wide-angle position, an intermediate position, and a telephoto position of the zoom optical system of FIG. 3, respectively.
Figure 4B:
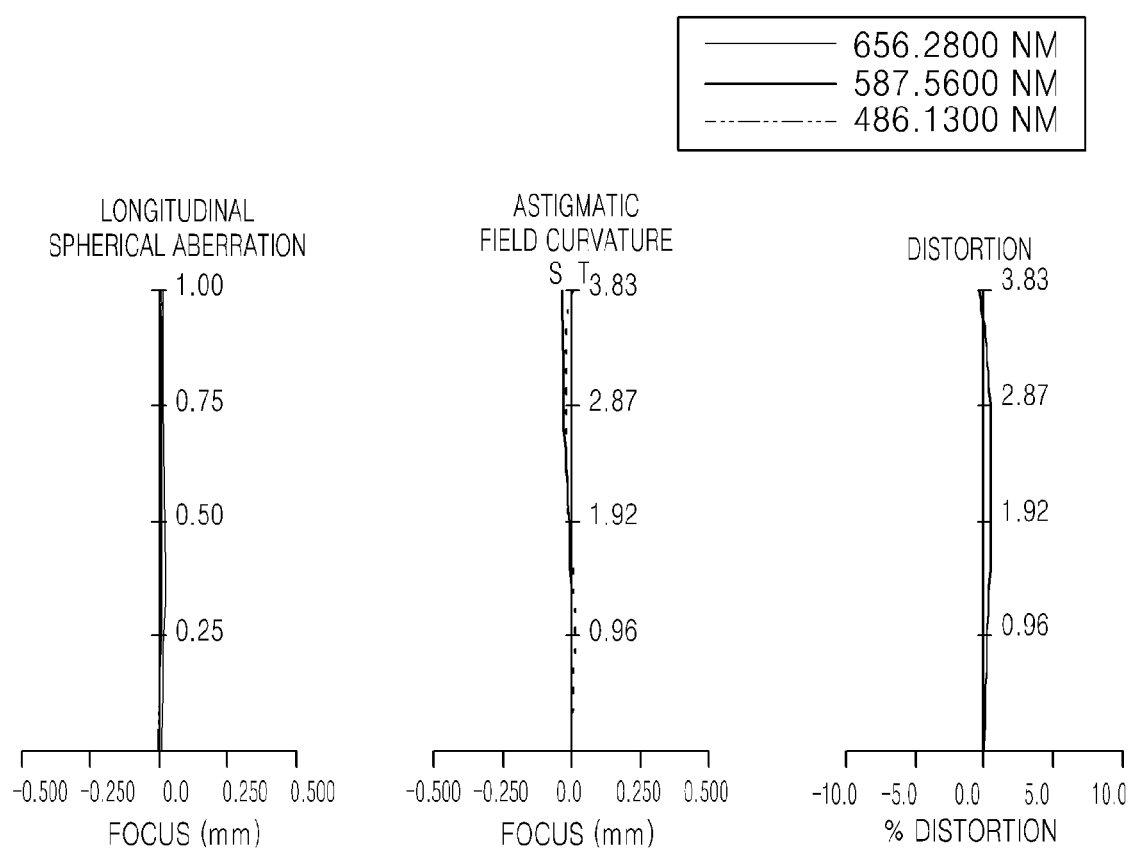
Figure 4C:
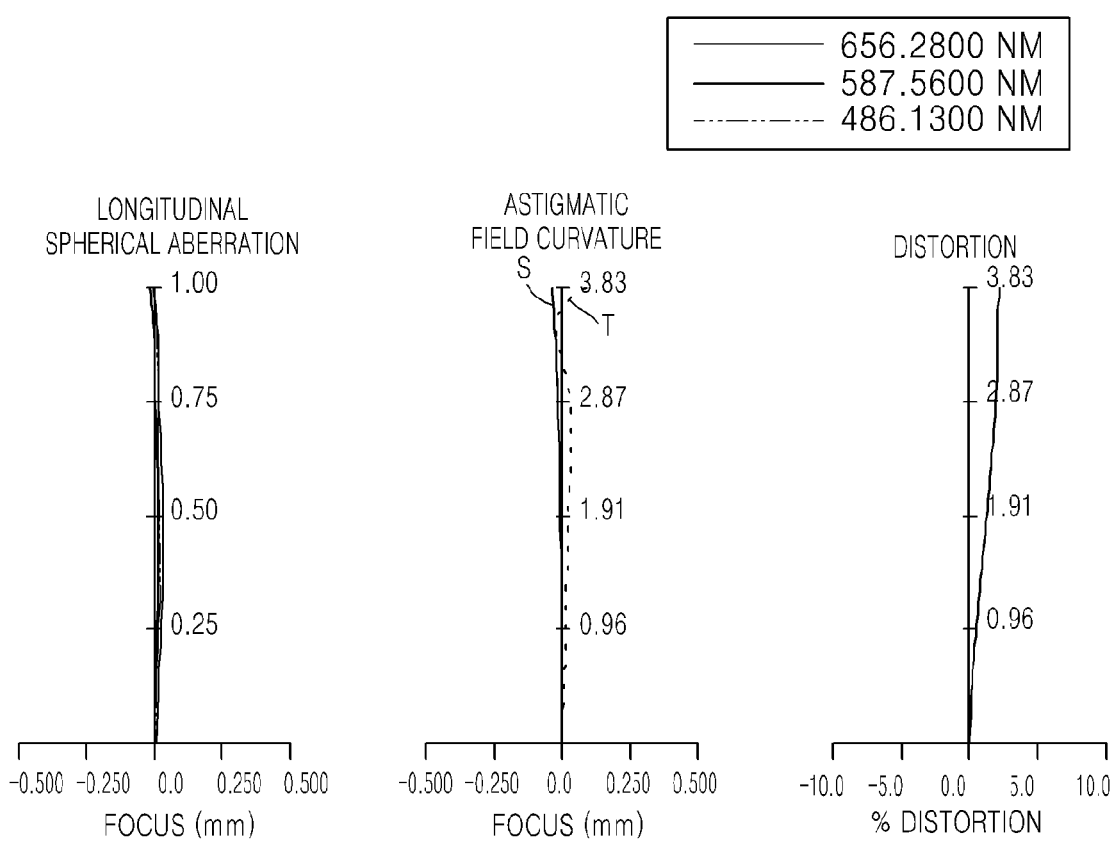

FIG. 4A shows diagrams of longitudinal spherical aberrations, astigmatic field curvatures (i.e., tangential field curvature (T) and sagittal field curvature (S)), and distortion with respect to light beams having wavelengths of 486.1300 nm, 587.5600 nm, and 656.2800 nm at the wide-angle position of the zoom optical system of FIG. 3. FIGS. 4B and 4C show diagrams of longitudinal spherical aberrations, astigmatic field curvatures, and % distortions at the intermediate position and the telephoto position of the zoom optical system of FIG. 3.

Third Embodiment

FIG. 5 is shows a zoom optical system according to another embodiment of the invention. The first lens group G1 includes a first lens 10-3, a second lens 20-3 and a third lens 30-3. The second lens group G2 includes a fourth lens 40-3, a fifth lens 50-3 and a sixth lens 60-3. The third lens group G3 includes a seventh lens 70-3. An infrared ray filter and a cover glass may be disposed between the seventh lens 70-3 and an image IMG surface.

The following is lens data of Third Embodiment.

| | wide-angle position | intermediate position | telephoto position |
|---|---|---|---|
| f | 5.08 | 8.40 | 14.48 |
| Fno | 2.77 | 3.58 | 5.15 |
| 2ω | 81.24 | 49.10 | 29.04 |

| | RDY | THI | GLA |
|---|---|---|---|
| OBJ | INFINITY | INFINITY | |
| 1 | 246.79456 | 0.600000 | 883000.408054 |
| 2 | 6.11079 | 1.169209 | |
| 3* | 7.51000 | 0.500000 | 531100.559100 |
| 4* | 7.54000 | 0.180058 | |
| 5 | 11.72829 | 1.300000 | 922860.202100 |
| 6 | 42.86759 | D1 | |
| STO | INFINITY | 0.000000 | |
| 8* | 4.42274 | 1.110000 | 693500.532008 |
| 9* | −20.89590 | 0.100000 | |
| 10 | 11.65536 | 1.350000 | 834100.320971 |
| 11 | −3.89249 | 0.300000 | 717407.264427 |
| 12 | 3.00073 | D2 | |
| 13* | 52.08977 | 1.260000 | 531100.559100 |
| 14* | −10.01368 | D3 | |
| 15 | INFINITY | 0.300000 | 755201.275795 |
| 16 | INFINITY | 0.300000 | |

-continued

| | | | | |
|---|---|---|---|---|
| 17 | INFINITY | 0.500000 | 748554.278534 | |
| 18 | INFINITY | 0.590000 | | |
| IMG | INFINITY | D4 | | |

| Surface | K | A | B | C | D |
|---|---|---|---|---|---|
| 3 | 0.654342 | −.468567E−03 | −.961825E−04 | 0.484712E−05 | −.832110E−07 |
| 4 | −1.594051 | −.407567E−03 | −.834084E−04 | 0.464634E−05 | −.848992E−07 |
| 8 | −4.089675 | 0.421847E−02 | −.305880E−03 | 0.118049E−04 | 0.000000E+00 |
| 9 | 0.000000 | 0.944859E−03 | 0.538241E−05 | 0.000000E+00 | 0.000000E+00 |
| 13 | 0.000000 | 0.603703E−03 | −.888491E−04 | 0.371101E−05 | −.263691E−06 |
| 14 | −26.848399 | −.142493E−02 | 0.884733E−04 | −.658610E−05 | 0.000000E+00 |

| | wide-angle position | intermediate position | telephoto position |
|---|---|---|---|
| D1 | 11.013 | 4.341 | 0.414 |
| D2 | 3.469 | 6.419 | 12.255 |
| D3 | 2.808 | 2.761 | 1.985 |
| D4 | −0.014 | 0.014 | 0.010 |

Figure 6A:
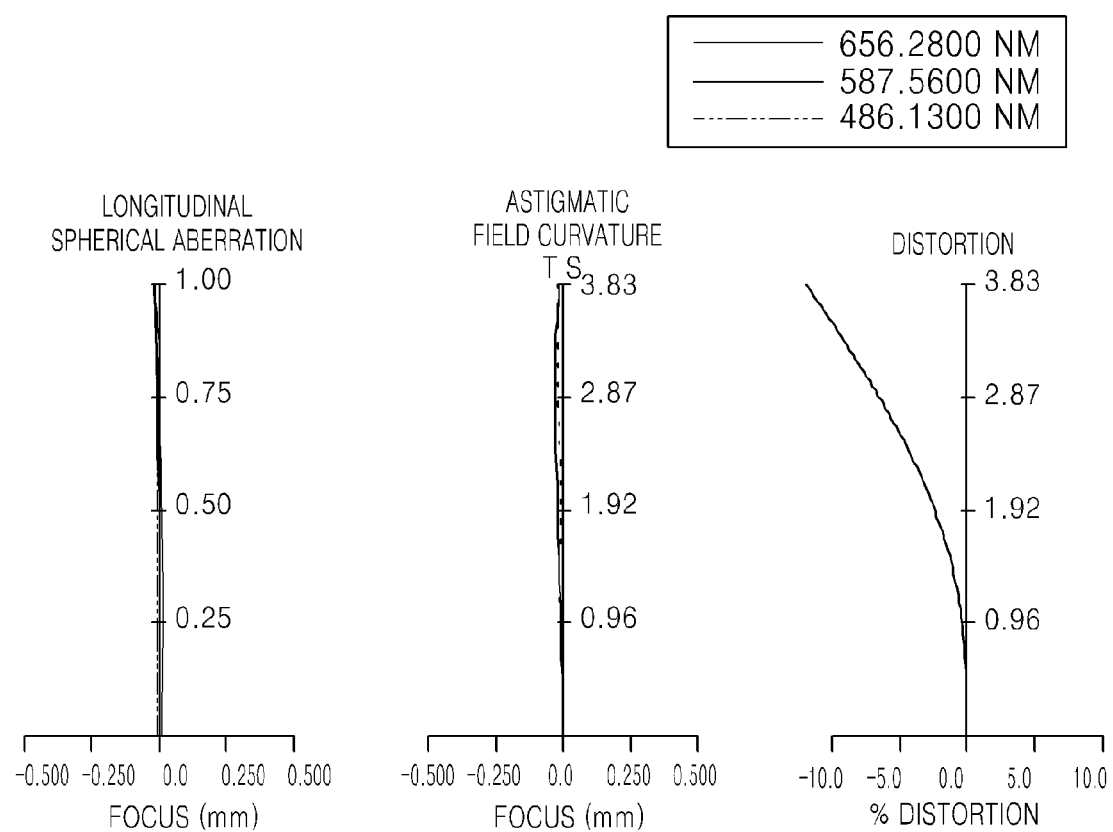
FIGS. 6A, 6B and 6C show diagrams of longitudinal spherical aberrations, astigmatic field curvatures and % distortions at a wide-angle position, an intermediate position, and a telephoto position of the zoom optical system of FIG. 5, respectively.
Figure 6B:
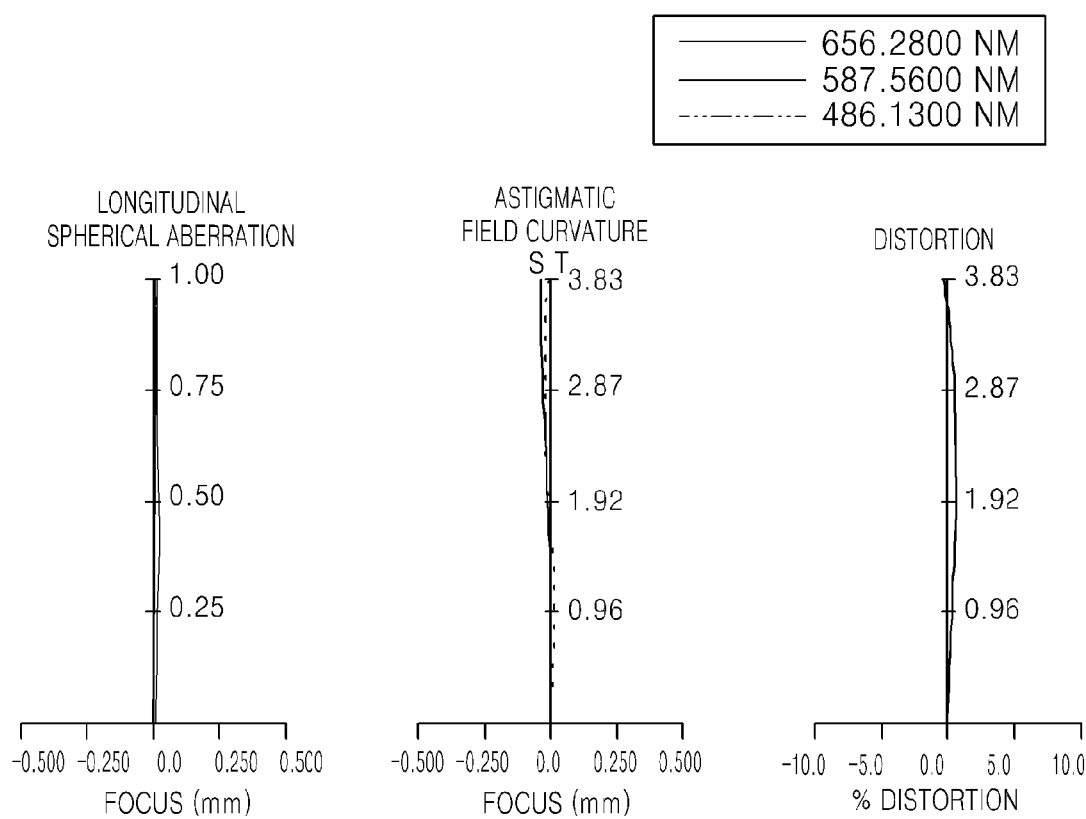
Figure 6C:
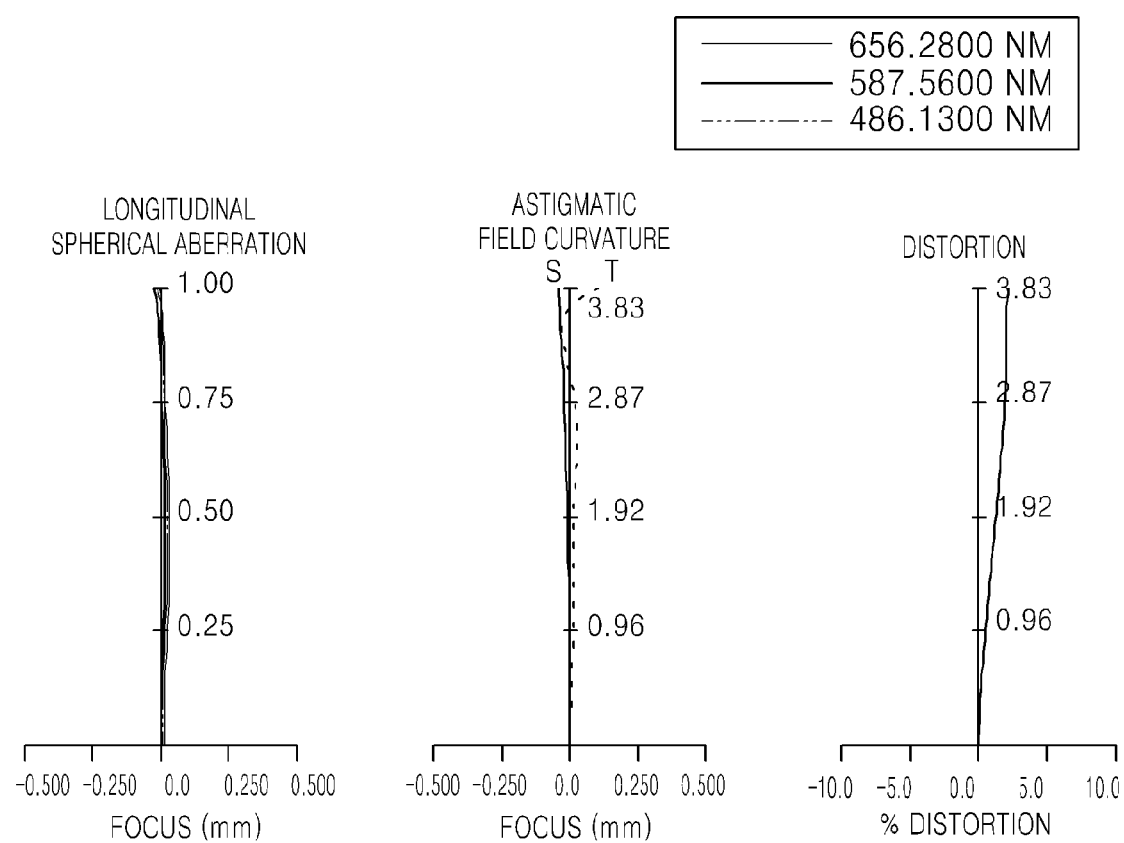

FIG. 6A shows diagrams of longitudinal spherical aberrations, astigmatic field curvatures (i.e., tangential field curvature (T) and sagittal field curvature (S)), and distortion with respect to light beams having wavelengths of 486.1300 nm, 587.5600 nm, and 656.2800 nm at the wide-angle position of the zoom optical system of FIG. 5. FIGS. 6B and 6C show diagrams of longitudinal spherical aberrations, astigmatic field curvatures, and % distortions at the intermediate position and the telephoto position of the zoom optical system of FIG. 5.

Fourth Embodiment

FIG. 7 shows a zoom optical system according to another embodiment of the invention. The first lens group G1 includes a first lens 10-4, a second lens 20-4 and a third lens 30-4. The second lens group G2 includes a fourth lens 40-4, a fifth lens 50-4, and a sixth lens 60-4. The third lens group G3 includes a seventh lens 70-4. An infrared ray filter and a cover glass may be disposed between the seventh lens 70-3 and an image IMG surface. The zoom optical system according to the present embodiment further includes the fourth lens group G4 that is disposed between the first lens group G1 and the object OBJ side. The fourth lens group G4 includes the eighth lens 80-1 and the ninth lens 90-1.

The following is lens data of Fourth Embodiment.

| | wide-angle position | intermediate position | telephoto position |
|---|---|---|---|
| f | 5.15 | 10.75 | 24.04 |
| Fno | 3.02 | 3.77 | 4.73 |
| 2ω | 80.48 | 38.52 | 17.58 |

| | RDY | THI | GLA |
|---|---|---|---|
| OBJ | INFINITY | INFINITY | |
| 1 | 29.77047 | 0.600000 | 922860.208804 |
| 2 | 15.24582 | 2.300000 | 806099.332694 |
| 3 | −105.27397 | D1 | |
| 4 | −64.47571 | 0.600000 | 883000.408054 |
| 5 | 5.12954 | 1.400000 | |
| 6* | 12.50000 | 0.600000 | 531100.559100 |
| 7* | 12.50000 | 0.100000 | |
| 8 | 7.61616 | 1.200000 | 897912.191024 |
| 9 | 10.91741 | D2 | |
| STO | INFINITY | 0.000000 | |
| 11* | 5.79702 | 1.331480 | 583130.594609 |
| 12* | −25.72111 | 0.100875 | |
| 13 | 4.61392 | 1.299977 | 555120.700646 |
| 14 | 7.07837 | 0.599674 | 846660.237800 |
| 15 | 3.40040 | D3 | |
| 16* | 9.81551 | 1.500000 | 531100.559100 |
| 17* | −39.74744 | D4 | |
| 18 | INFINITY | 0.300000 | 516798.641983 |
| 19 | INFINITY | 0.300000 | |
| 20 | INFINITY | 0.500000 | 516798.641983 |
| 21 | INFINITY | 0.379998 | |
| IMG | INFINITY | D5 | |

| Surface | K | A | B | C | D |
|---|---|---|---|---|---|
| 6 | 1.679716 | −.156473E−02 | −.457583E−04 | 0.935407E−05 | 0.000000E+00 |
| 7 | −3.515254 | −.156249E−02 | −.295886E−04 | 0.788859E−05 | 0.000000E+00 |
| 11 | 0.409323 | −.374757E−03 | −.507100E−04 | 0.190149E−04 | 0.000000E+00 |

-continued

| | | | | |
|---|---|---|---|---|
| 12 | −66.082949 | 0.233822E−03 | −.147462E−04 | 0.225476E−04 | 0.000000E+00 |
| 16 | −10.697560 | 0.198663E−03 | 0.490301E−04 | −.372146E−05 | 0.000000E+00 |
| 17 | 20.847947 | −.892529E−03 | 0.856901E−04 | −.432875E−05 | 0.000000E+00 |

| | wide-angle position | intermediate position | telephoto position |
|---|---|---|---|
| D1 | 0.700 | 5.591 | 11.811 |
| D2 | 10.600 | 4.630 | 0.700 |
| D3 | 2.400 | 4.296 | 10.571 |
| D4 | 4.961 | 7.042 | 9.309 |
| D5 | −0.020 | −0.008 | 0.045 |

Figure 8A:
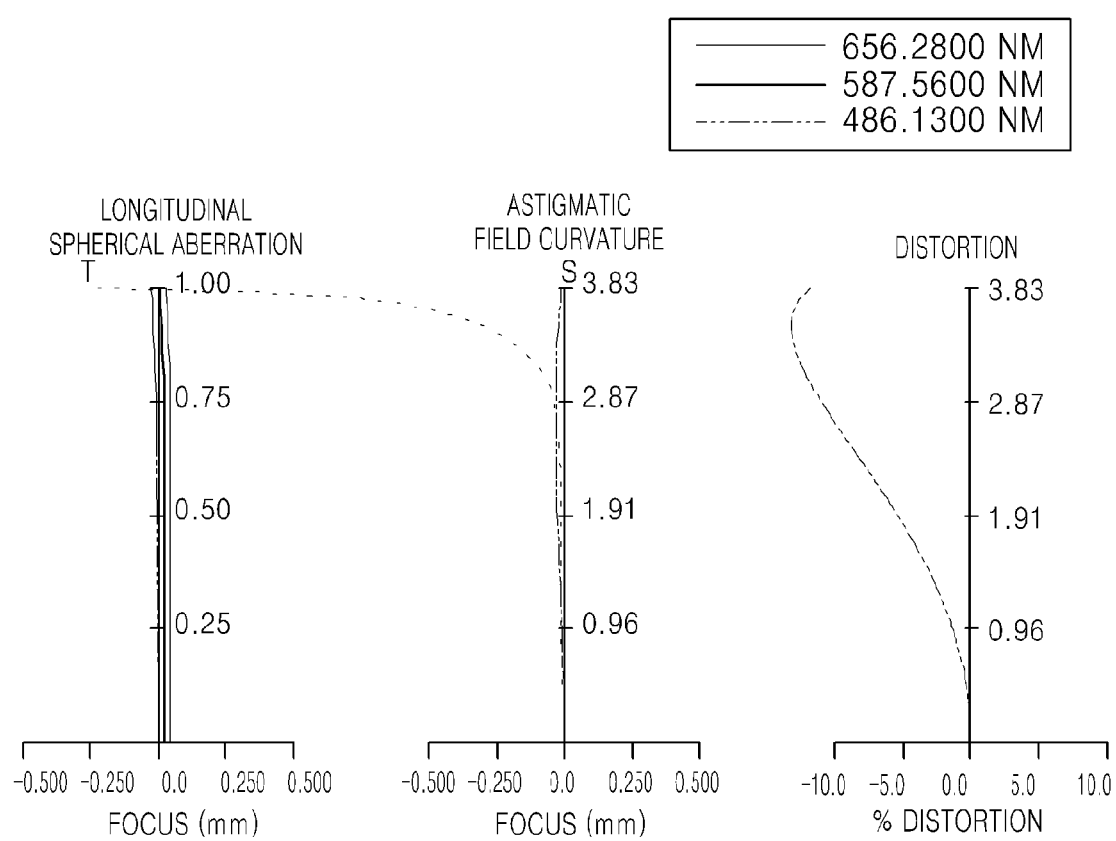
Figure 8C:
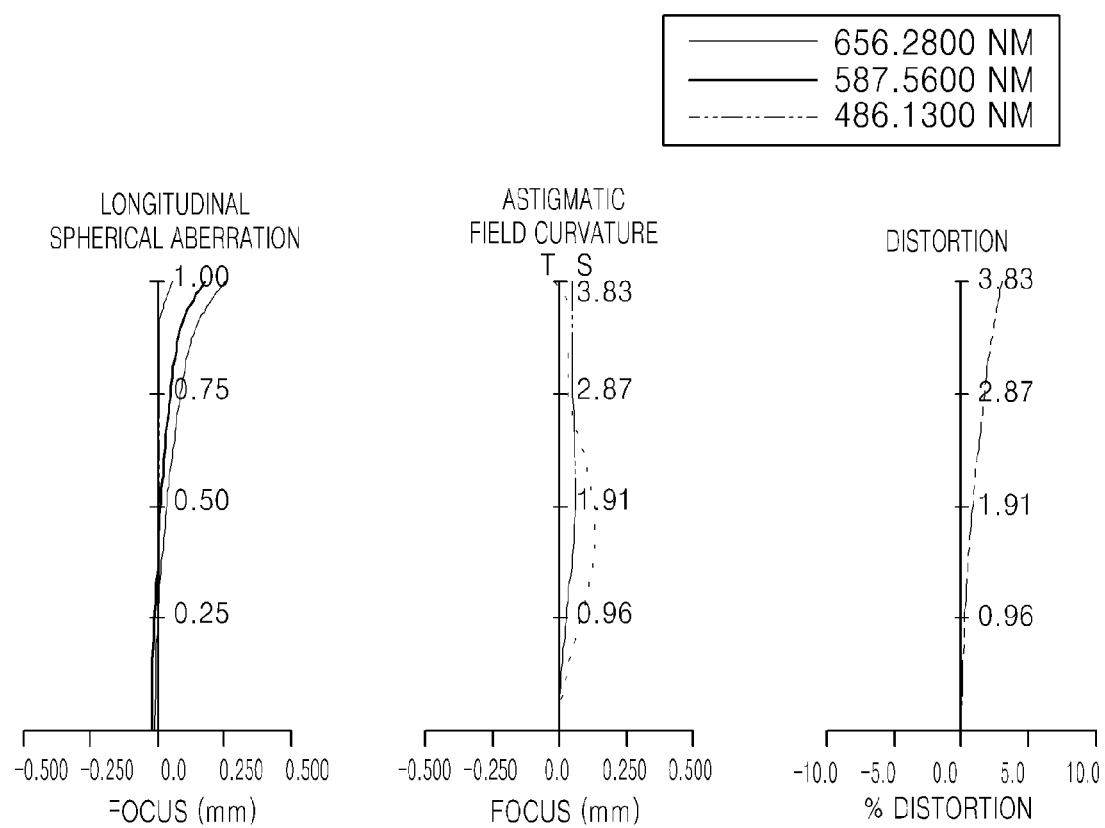

FIG. 8A show diagrams of longitudinal spherical aberrations, astigmatic field curvatures (i.e., tangential field curvature (T) and sagittal field curvature (S)), and distortion with respect to light beams having wavelengths of 486.1300 nm, 587.5600 nm, and 656.2800 nm at the wide-angle position of the zoom optical system of FIG. 7. FIGS. 8B and 8C show diagrams of longitudinal spherical aberrations, astigmatic field curvatures, and % distortions at the intermediate position and the telephoto position of the zoom optical system of FIG. 7.

Fifth Embodiment

FIG. 9 shows a zoom optical system according to another embodiment of the invention. The first lens group G1 includes a first lens 10-5, a second lens 20-5 and a third lens 30-5. The second lens group G2 includes a fourth lens 40-5, a fifth lens 50-5 and a sixth lens 60-5. The third lens group G3 includes a seventh lens 70-5. An infrared ray filter and a cover glass may be disposed between the seventh lens 70-5 and an image IMG surface. The zoom optical system according to the present embodiment further includes the fourth lens group G4 that is disposed between the first lens group G1 and the object OBJ side. The fourth lens group G4 includes the eighth lens 80-2 and the ninth lens 90-2.

The following is lens data of Fifth Embodiment.

| | wide-angle position | intermediate position | telephoto position |
|---|---|---|---|
| f | 5.13 | 10.74 | 24.05 |
| Fno | 3.02 | 3.77 | 4.69 |
| 2ω | 80.74 | 38.54 | 17.56 |

| | RDY | THI | GLA |
|---|---|---|---|
| OBJ | INFINITY | INFINITY | |
| 1 | 30.08675 | 0.600000 | 907469.212752 |
| 2 | 15.27989 | 2.300000 | 805752.339201 |
| 3 | −102.11902 | D1 | |
| 4 | −52.17180 | 0.600000 | 876464.322692 |
| 5 | 5.22726 | 1.400000 | |
| 6* | 12.50000 | 0.600000 | 531100.559100 |
| 7* | 12.50000 | 0.100000 | |
| 8 | 7.89378 | 1.200000 | 896788.191317 |
| 9 | 11.49104 | D2 | |
| STO | INFINITY | 0.000000 | |
| 11* | 5.80023 | 1.312728 | 583130.594609 |
| 12* | −26.17434 | 0.100794 | |
| 13 | 4.60199 | 1.298690 | 554814.701115 |
| 14 | 7.09535 | 0.598594 | 846660.237800 |
| 15 | 3.40161 | D3 | |
| 16* | 9.87018 | 1.500000 | 531100.559100 |
| 17* | −38.94652 | D4 | |
| 18 | INFINITY | 0.300000 | 516798.641983 |
| 19 | INFINITY | 0.300000 | |
| 20 | INFINITY | 0.500000 | 516798.641983 |
| 21 | INFINITY | 0.380000 | |
| IMG | INFINITY | D5 | |

| Surface | K | A | B | C | D |
|---|---|---|---|---|---|
| 6 | 1.692946 | −.156610E−02 | −.440615E−04 | 0.942359E−05 | 0.000000E+00 |
| 7 | −3.438244 | −.155960E−02 | −.310760E−04 | 0.781671E−05 | 0.000000E+00 |
| 11 | 0.402230 | −.381045E−03 | −.513738E−04 | 0.189453E−04 | 0.000000E+00 |
| 12 | −67.632012 | 0.240436E−03 | −.140536E−04 | 0.226141E−04 | 0.000000E+00 |
| 16 | −10.889938 | 0.194227E−03 | 0.491909E−04 | −.370255E−05 | 0.000000E+00 |
| 17 | 19.295692 | −.886955E−03 | 0.855519E−04 | −.434785E−05 | 0.000000E+00 |

| | wide-angle position | intermediate position | telephoto position |
|---|---|---|---|
| D1 | 0.688 | 5.558 | 11.784 |
| D2 | 10.597 | 4.634 | 0.691 |

-continued

| | | | |
|---|---|---|---|
| D3 | 2.397 | 4.288 | 10.281 |
| D4 | 4.966 | 7.039 | 9.211 |
| D5 | −0.017 | −0.013 | 0.045 |

Figure 10A:
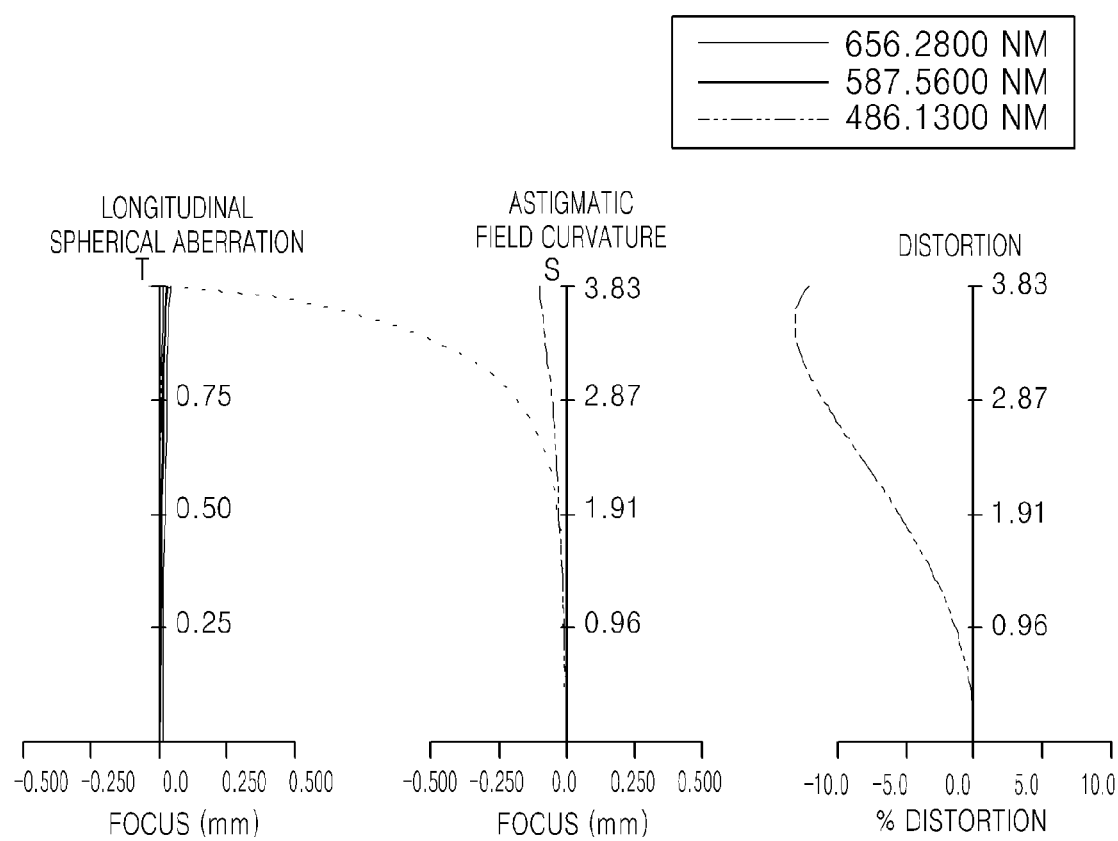
FIGS. 10A, 10B and 10C show diagrams of longitudinal spherical aberrations, astigmatic field curvatures and % distortions at a wide-angle position, an intermediate position, and a telephoto position of the zoom optical system of FIG. 9, respectively.
Figure 10B:
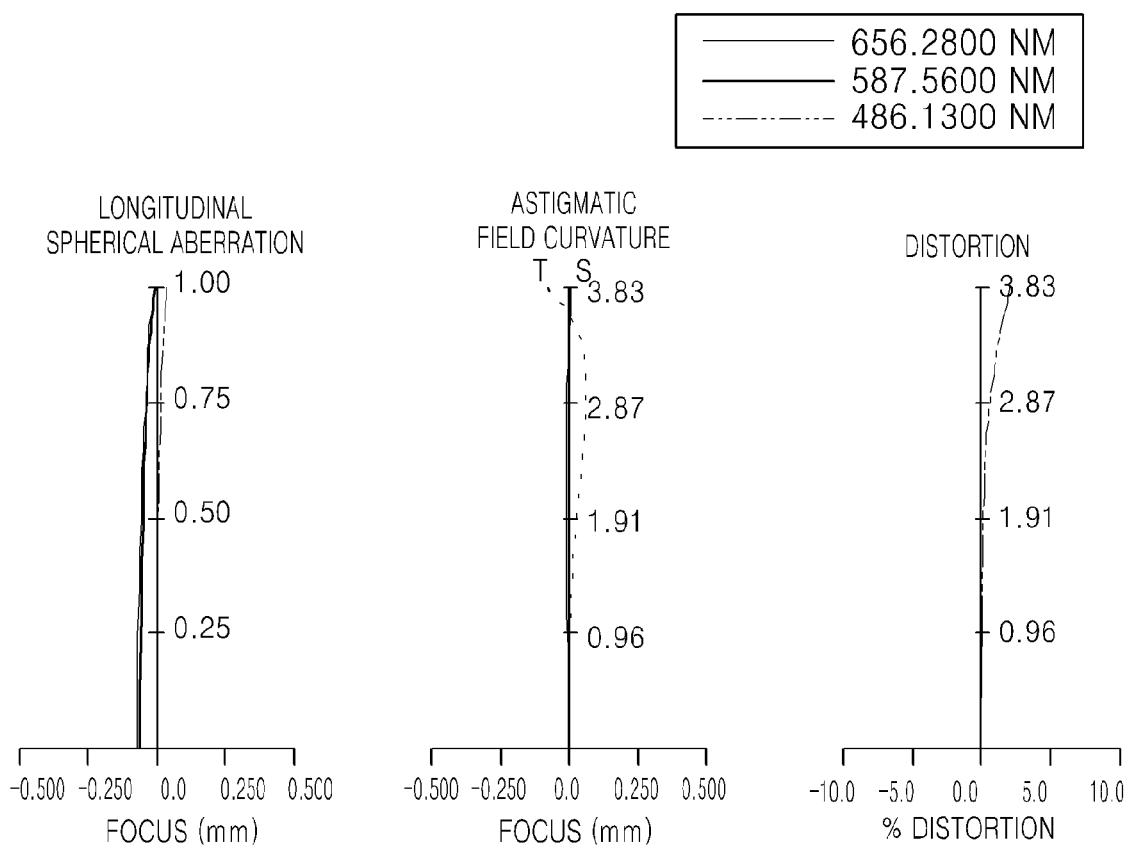
Figure 10C:
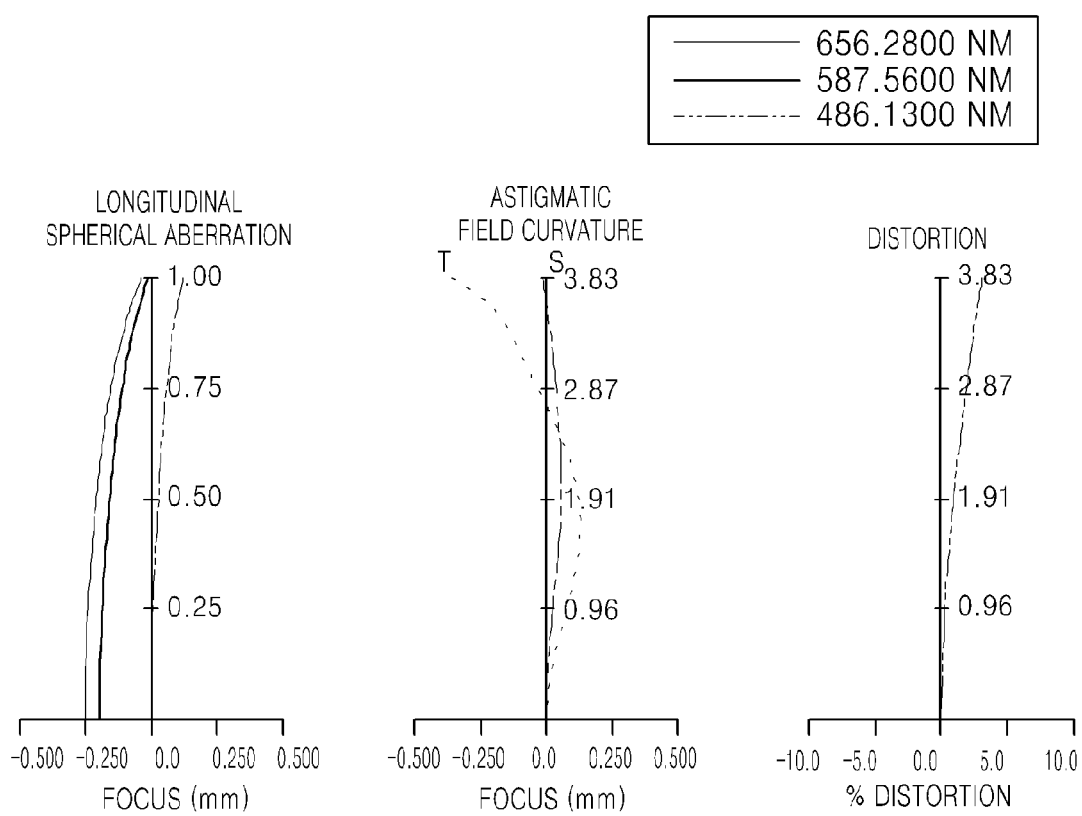

FIG. 10A shows diagrams of longitudinal spherical aberrations, astigmatic field curvatures (i.e., tangential field curvature (T) and sagittal field curvature (S)), and distortion with respect to light beams having wavelengths of 486.1300 nm, 587.5600 nm, and 656.2800 nm at the wide-angle position of the zoom optical system of FIG. 9. FIGS. 10B and 10C show diagrams of longitudinal spherical aberrations, astigmatic field curvatures, and % distortions at the intermediate position and the telephoto position of the zoom optical system of FIG. 9.

Sixth Embodiment

FIG. 11 shows a zoom optical system according to another embodiment of the invention. The first lens group G1 includes a first lens 10-6, a second lens 20-6 and a third lens 30-6. The second lens group G2 includes a fourth lens 40-6, a fifth lens 50-6 and a sixth lens 60-6. The third lens group G3 includes a seventh lens 70-6. An infrared ray filter and a cover glass may be disposed between the seventh lens 70-6 and an image IMG surface. The zoom optical system according to the present embodiment further includes the fourth lens group G4 that is disposed between the first lens group G1 and the object OBJ side. The fourth lens group G4 includes the eighth lens 80-3 and the ninth lens 90-3.

The following is lens data of Sixth Embodiment.

| | wide-angle position | intermediate position | telephoto position |
|---|---|---|---|
| f | 5.12 | 10.8 | 24.09 |
| Fno | 3.02 | 3.76 | 4.69 |
| 2ω | 80.74 | 38.40 | 17.56 |

| | RDY | THI | GLA |
|---|---|---|---|
| OBJ | INFINITY | INFINITY | |
| 1 | 29.93548 | 0.600000 | 907469.212752 |
| 2 | 15.25995 | 2.300000 | 805752.339201 |
| 3 | −104.34028 | D1 | |
| 4 | −62.97276 | 0.600000 | 876464.322692 |
| 5 | 5.13942 | 1.400000 | |
| 6* | 12.50000 | 0.600000 | 531100.559100 |
| 7* | 12.50000 | 0.100000 | |
| 8 | 7.52487 | 1.200000 | 896788.191317 |
| 9 | 10.72412 | D2 | |
| STO | INFINITY | 0.000000 | |
| 11* | 5.80069 | 1.326048 | 583130.594609 |
| 12* | −26.44407 | 0.102892 | |
| 13 | 4.59432 | 1.298685 | 554814.701115 |
| 14 | 7.09816 | 0.598593 | 846660.237800 |
| 15 | 3.40183 | D3 | |
| 16* | 9.85190 | 1.500000 | 531100.559100 |
| 17* | −39.23848 | D4 | |
| 18 | INFINITY | 0.300000 | 516798.641983 |
| 19 | INFINITY | 0.300000 | |
| 20 | INFINITY | 0.500000 | 516798.641983 |
| 21 | INFINITY | 0.379975 | |
| IMG | INFINITY | D5 | |

| Surface | K | A | B | C | D |
|---|---|---|---|---|---|
| 6 | 0.792004 | −.167711E−02 | −.307613E−04 | 0.991891E−05 | 0.000000E+00 |
| 7 | −3.657033 | −.160279E−02 | −.359126E−04 | 0.960750E−05 | 0.000000E+00 |
| 11 | 0.228819 | −.603970E−03 | −.408068E−04 | 0.195974E−04 | 0.000000E+00 |
| 12 | −38.560855 | 0.845682E−04 | −.257749E−04 | 0.237861E−04 | 0.000000E+00 |
| 16 | −7.625258 | 0.231865E−03 | 0.496903E−04 | −.436414E−05 | 0.000000E+00 |
| 17 | −98.730043 | −.745396E−03 | 0.759041E−04 | −.479477E−05 | 0.000000E+00 |

| | wide-angle position | intermediate position | telephoto position |
|---|---|---|---|
| D1 | 0.680 | 5.547 | 11.774 |
| D2 | 10.675 | 4.628 | 0.688 |
| D3 | 2.336 | 4.292 | 10.093 |
| D4 | 4.961 | 7.043 | 9.207 |
| D5 | −0.010 | −0.033 | −0.045 |

Figure 12A:
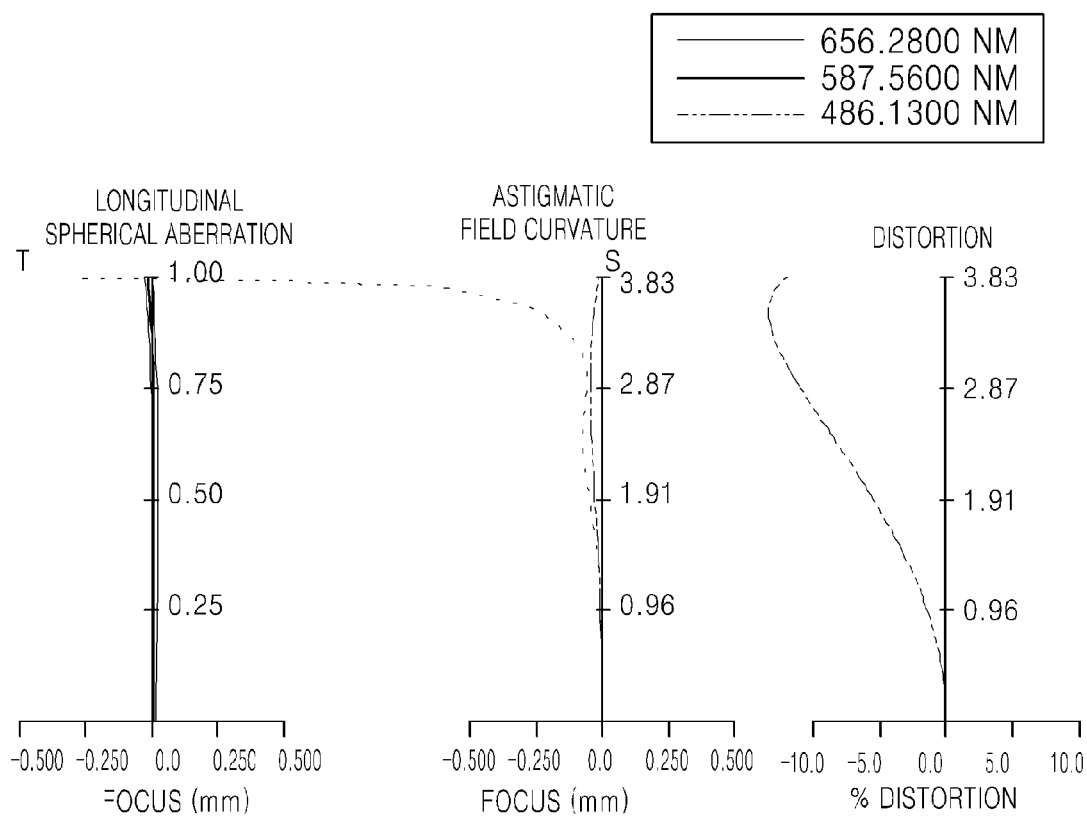
FIGS. 12A, 12B and 12C show diagrams of longitudinal spherical aberrations, astigmatic field curvatures and % distortions at a wide-angle position, an intermediate position, and a telephoto position of the zoom optical system of FIG. 11, respectively.
Figure 12B:
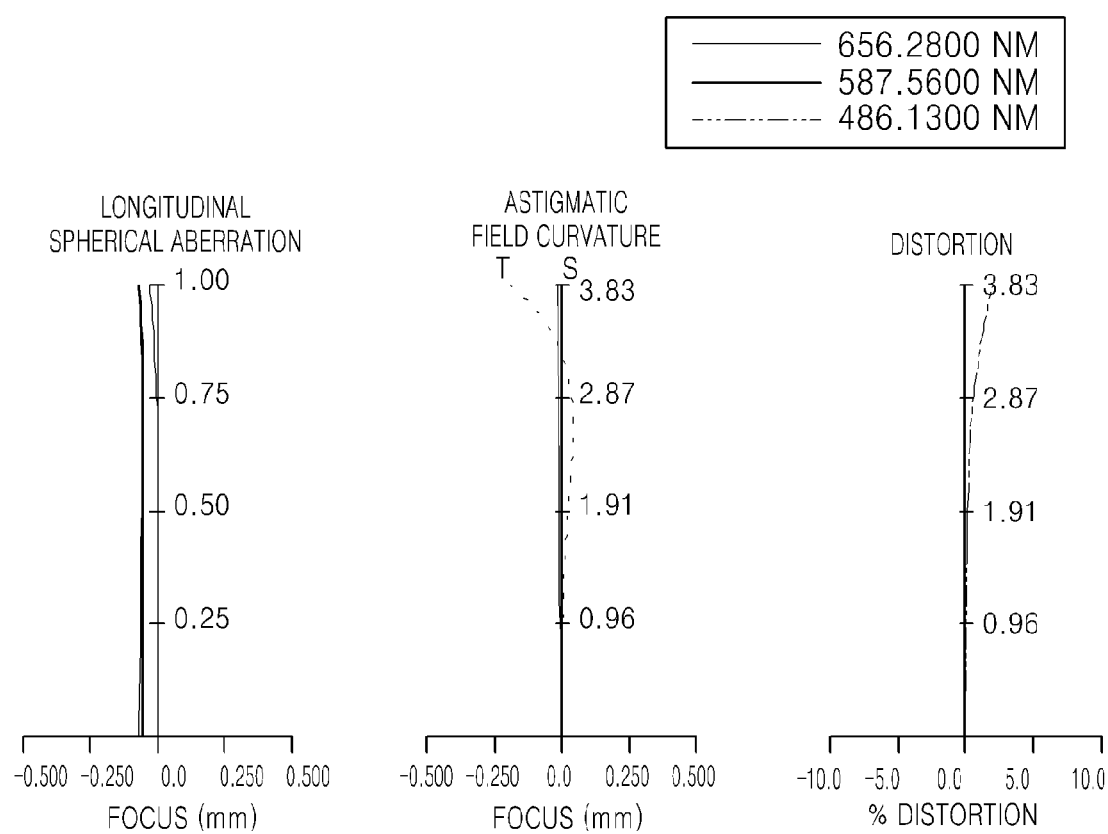
Figure 12C:
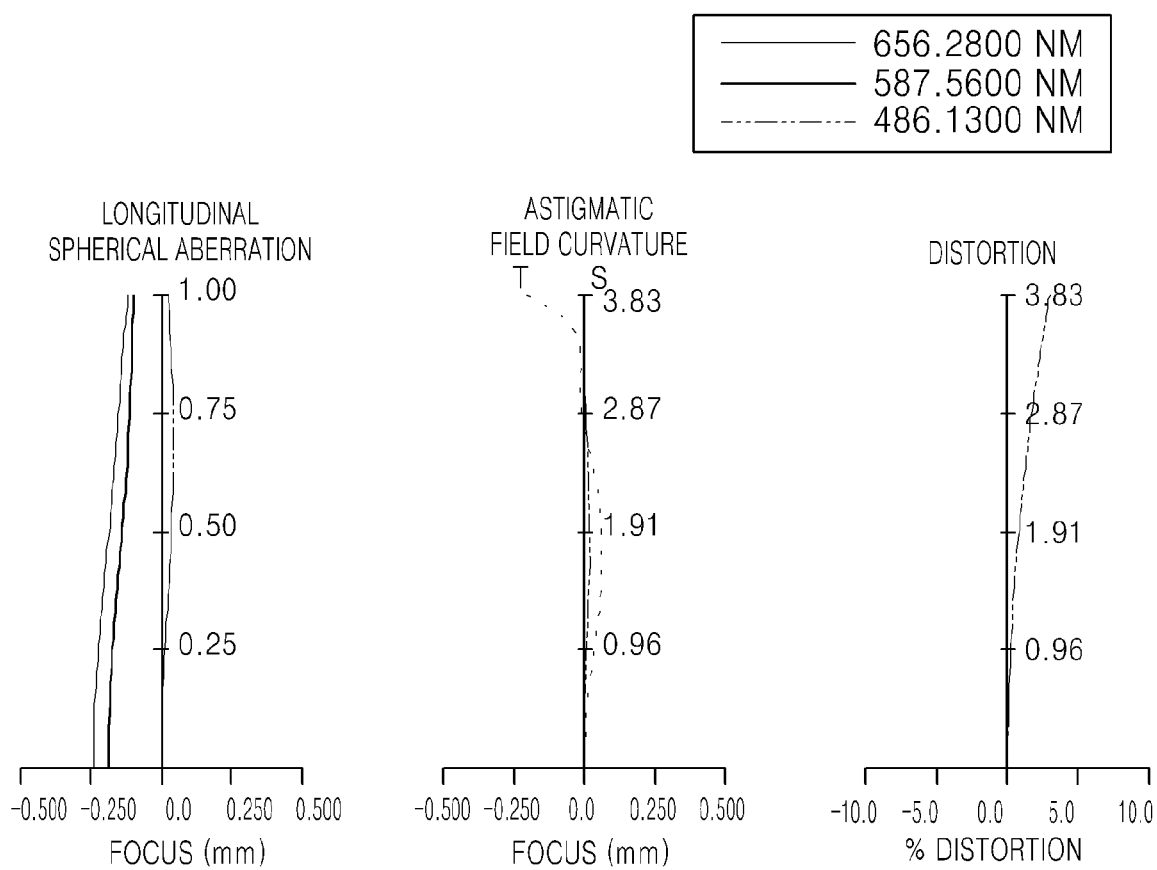

FIG. 12A shows diagrams of longitudinal spherical aberrations, astigmatic field curvatures (i.e., tangential field curvature (T) and sagittal field curvature (S)), and distortion with respect to light beams having wavelengths of 486.1300 nm, 587.5600 nm, and 656.2800 nm at the wide-angle position of the zoom optical system of FIG. 11. FIGS. 12B and 12C show diagrams of longitudinal spherical aberrations, astigmatic field curvatures, and % distortions at the intermediate position and the telephoto position of the zoom optical system of FIG. 11.

Through the above-described construction of lenses, the zoom optical system according to embodiments of the invention is miniaturized at a low cost, and has an excellent optical performance of high magnification.

The zoom optical system according to embodiments of the invention is miniaturized, and realizes high magnification at a low cost.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A zoom optical system comprising:
a first lens group comprising a plastic aspherical lens and having a negative refractive power;
a second lens group having a positive refractive power; and
a third lens group having a positive refractive power,
wherein the first lens group, the second lens group and the third lens group are arranged sequentially from an object side to an image side, and
wherein the plastic aspherical lens satisfies Inequality 1:

$$0 \leq (R21-R22)^2 \leq 0.04, \qquad \text{Inequality 1}$$

where R21 denotes the radius of curvature of the plastic aspherical lens corresponding to the object side, and R22 denotes the radius of curvature of the plastic aspherical lens corresponding to the image side.

2. The zoom optical system of claim 1, wherein the plastic aspherical lens satisfies Inequality 2:

$$0 \leq (T2c-T2e)^2 \leq 0.09, \qquad \text{Inequality 2}$$

where T2c denotes the thickness of the center of the plastic aspherical lens, and T2e denotes the thickness of the edge of the plastic aspherical lens.

3. The zoom optical system of claim 1, wherein the third lens group comprises at least one plastic aspherical lens.

4. The zoom optical system of claim 1, wherein each plastic aspherical lens satisfies at least one of Inequality 3 and 4:

$$1.5 \leq n \leq 1.6 \qquad \text{Inequality 3}$$

$$50 \leq v \leq 60, \qquad \text{Inequality 4}$$

where 'n' denotes the refractive index of the plastic aspherical lens, and 'v' denotes an Abbe number of the plastic aspherical lens.

5. The zoom optical system of claim 3, wherein each plastic aspherical lens satisfies at least one of Inequality 3 and 4:

$$1.5 \leq n \leq 1.6 \qquad \text{Inequality 3}$$

$$50 \leq v \leq 60, \qquad \text{Inequality 4}$$

where 'n' denotes the refractive index of the plastic aspherical lens, and 'v' denotes an Abbe number of the plastic aspherical lens.

6. The zoom optical system of claim 1, wherein, during zooming from a wide-angle position to a telephoto position, the first lens group, the second lens group and the third lens group are moved along the optical axis.

7. The zoom optical system of claim 1, wherein the second lens group comprises: a positive lens formed of a glass material and having an aspherical surface; and a double lens formed by bonding a positive lens and a negative lens to each other.

8. The zoom optical system of claim 1, wherein the first lens group comprises a meniscus lens having a surface being convex towards the object side.

9. The zoom optical system of claim 1, wherein the zoom optical system satisfies Inequality 5:

$$4.0 \leq Tw/fw \leq 7.0, \qquad \text{Inequality 5}$$

where Tw denotes the full length of the zoom optical system at a wide-angle position, and fw denotes the focal length of the zoom optical system at the wide-angle position.

10. The zoom optical system of claim 1, further comprising: a fourth lens group comprising a double lens disposed between the first lens group and the object side, and having a positive refractive power.

11. The zoom optical system of claim 10, wherein the double lens comprises a lens having a negative refractive power and a lens having a positive refractive power, which are arranged sequentially from the object side.

12. The zoom optical system of claim 10, wherein, during zooming from a wide-angle position to a telephoto position, the first lens group, the second lens group, the third lens group and the fourth lens group are moved along an optical axis.

13. The zoom optical system of claim 10, wherein the zoom optical system satisfies Inequality 5:

$$4.0 \leq Tw/fw \leq 7.0, \qquad \text{Inequality 5}$$

where Tw denotes the full length of the zoom optical system at a wide-angle position, and fw denotes the focal length of the zoom optical system at the wide-angle position.

* * * * *